(12) United States Patent
Hankawa et al.

(10) Patent No.: US 7,339,744 B2
(45) Date of Patent: Mar. 4, 2008

(54) ELECTRONIC IMAGING APPARATUS

(75) Inventors: Masashi Hankawa, Hachioji (JP); Eiji Shirota, Hino (JP); Kazuteru Kawamura, Hachioji (JP); Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 165 days.

(21) Appl. No.: 11/357,338

(22) Filed: Feb. 21, 2006

(65) Prior Publication Data

US 2006/0221212 A1    Oct. 5, 2006

(30) Foreign Application Priority Data

Mar. 31, 2005    (JP) .............................. 2005-103053

(51) Int. Cl.
 *G02B 15/14*    (2006.01)

(52) U.S. Cl. ...................... 359/682; 359/676; 359/680; 359/683; 359/691; 359/717; 359/740; 359/793; 396/85

(58) Field of Classification Search ................ 359/676, 359/680–684, 691, 717, 740, 793; 396/85
See application file for complete search history.

(56) References Cited

U.S. PATENT DOCUMENTS

| | | | |
|---|---|---|---|
| 6,995,924 B2 * | 2/2006 | Sato ........................... | 359/680 |
| 2002/0027721 A1 | 3/2002 | Mihara | |
| 2003/0206352 A1 | 11/2003 | Mihara et al. | |
| 2004/0201902 A1 | 10/2004 | Mihara et al. | |
| 2005/0207024 A1 * | 9/2005 | Mihara ........................ | 359/689 |

FOREIGN PATENT DOCUMENTS

| | | |
|---|---|---|
| JP | 10-213745 | 8/1998 |
| JP | 2002-072095 | 3/2002 |
| JP | 2004-163477 | 6/2004 |

* cited by examiner

*Primary Examiner*—Evelyn A. Lester
(74) *Attorney, Agent, or Firm*—Kenyon & Kenyon LLP

(57) ABSTRACT

An electronic imaging apparatus includes a zoom optical system having, in order from the object side, a first lens unit with negative power and a second lens unit with positive power, in which lens components having refracting power in the first lens unit are only a single biconcave negative lens element located at the most object-side position and a positive lens component located at the most image-side position; an electronic image sensor placed on the image side of the zoom optical system; and an image processing section electrically processing image data obtained by the electronic image sensor to change the shape thereof. The zoom lens system satisfies the following conditions in focusing of a nearly infinite object point:

$$0.85 < |y_{07}/(f_w \cdot \tan \omega_{07w})| < 0.97$$

$$0.75 < |y_{10}/(f_w \cdot \tan \omega_{10w})| < 0.93$$

where $f_w$ is the focal length of the entire zoom optical system at a wide-angle position, $y_{10}$ is a distance from the center of an effective imaging surface of the electronic image sensor to a point furthest from the center, $y_{07}$ is an image height expressed by 0.7 $y_{10}$, and $\omega_{07w}$ is an angle made by a direction of an object point corresponding to an image point, connecting the center of the effective imaging surface of the electronic image sensor at the wide-angle position and the position of the image height $y_{07}$, with the optical axis.

27 Claims, 21 Drawing Sheets

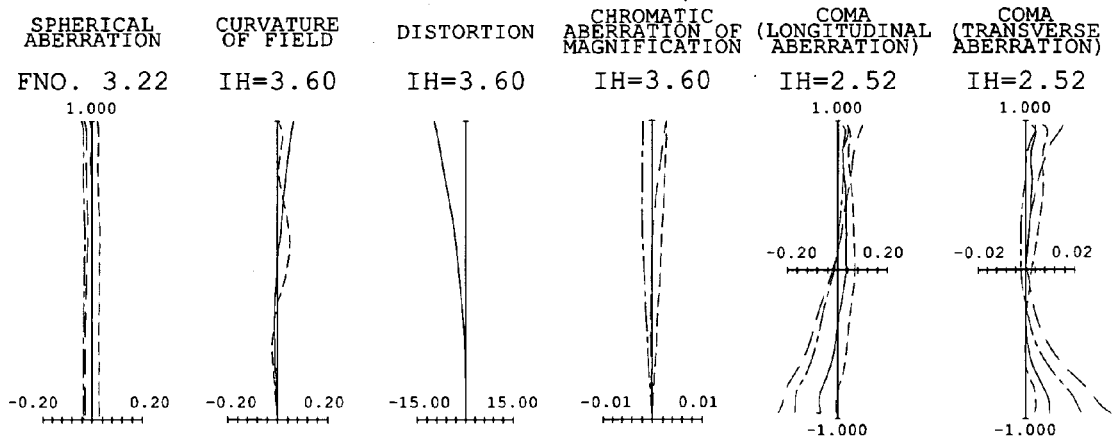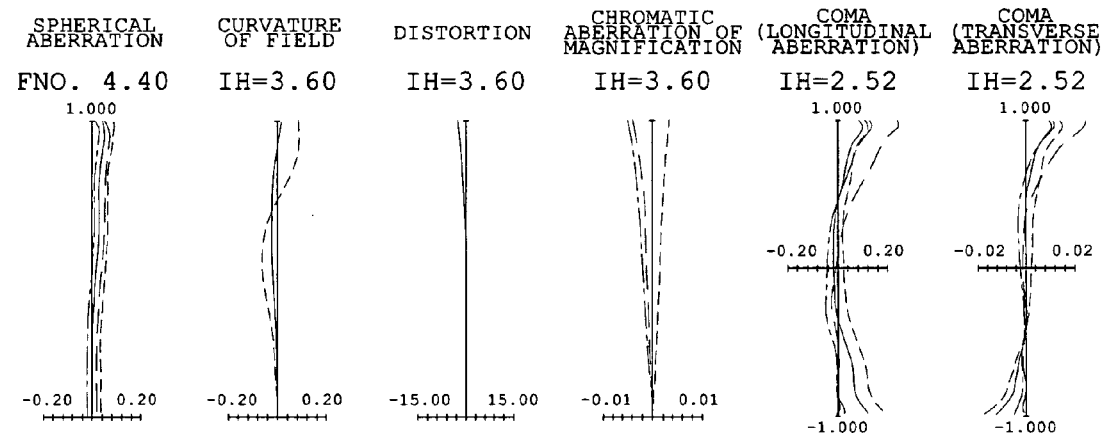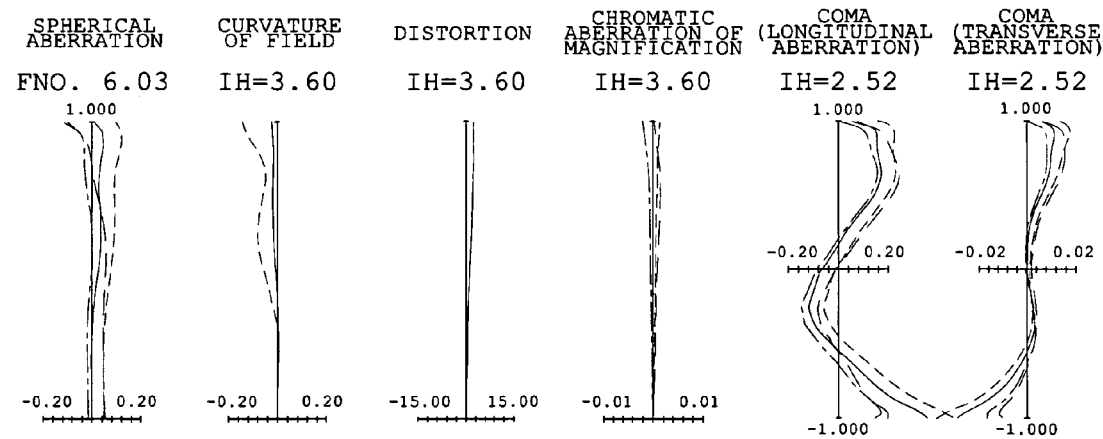

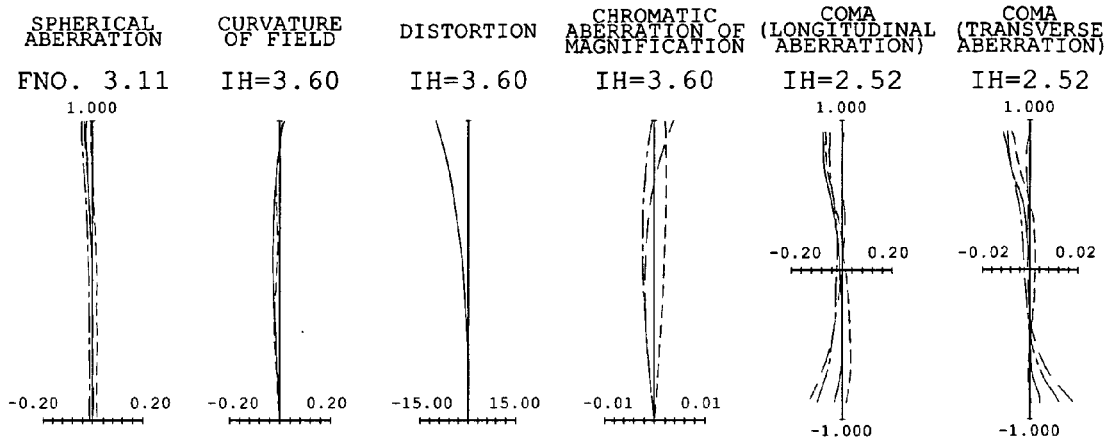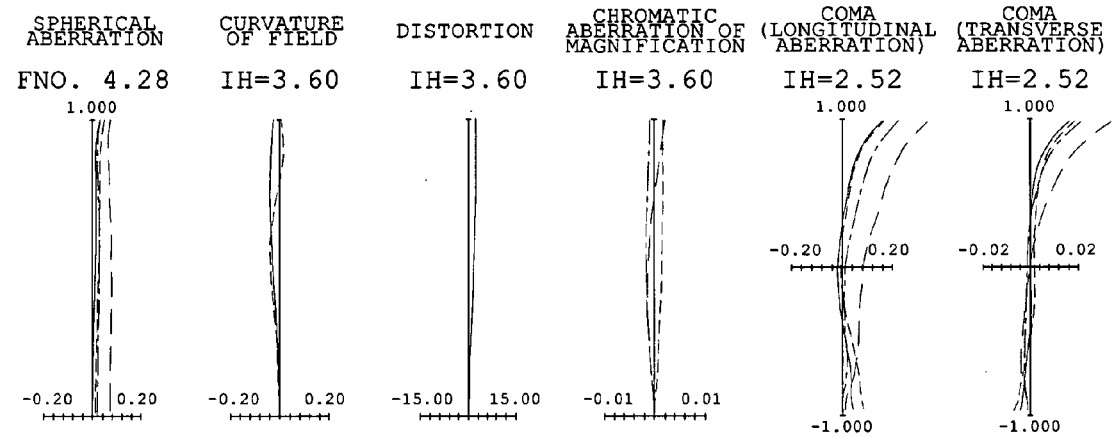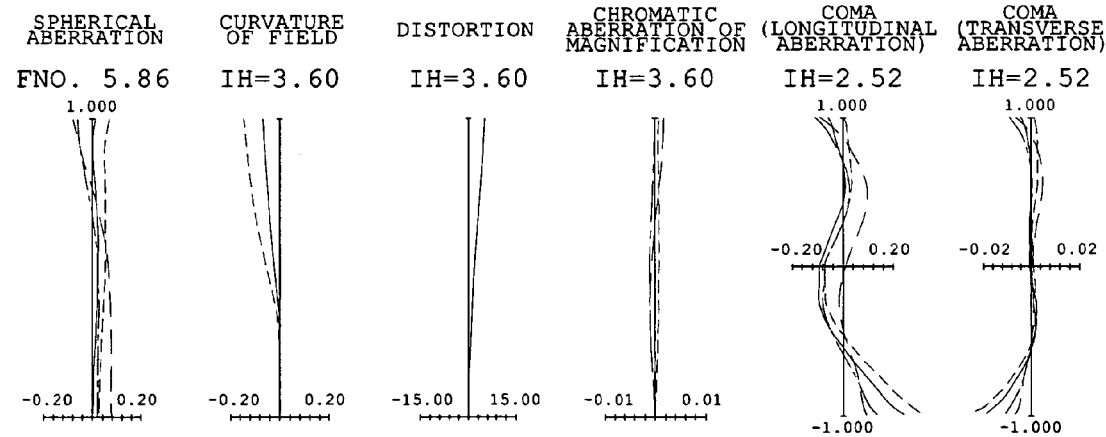

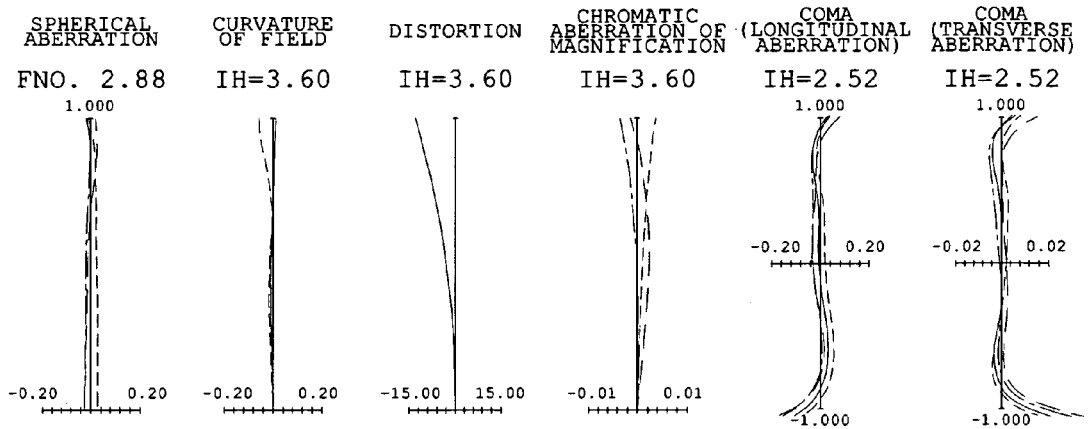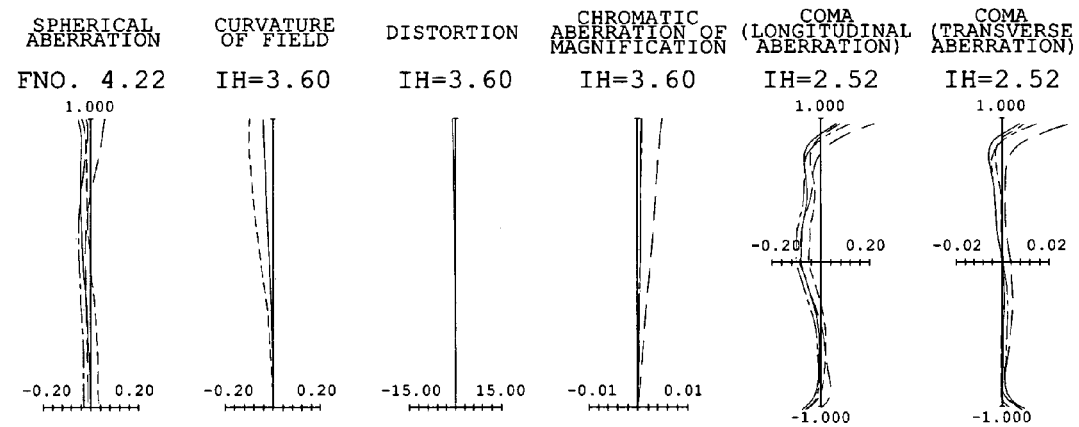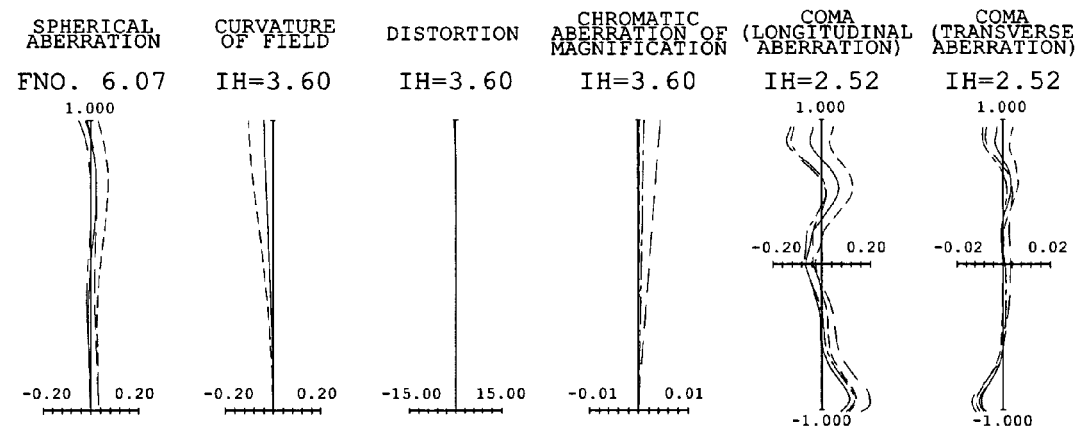

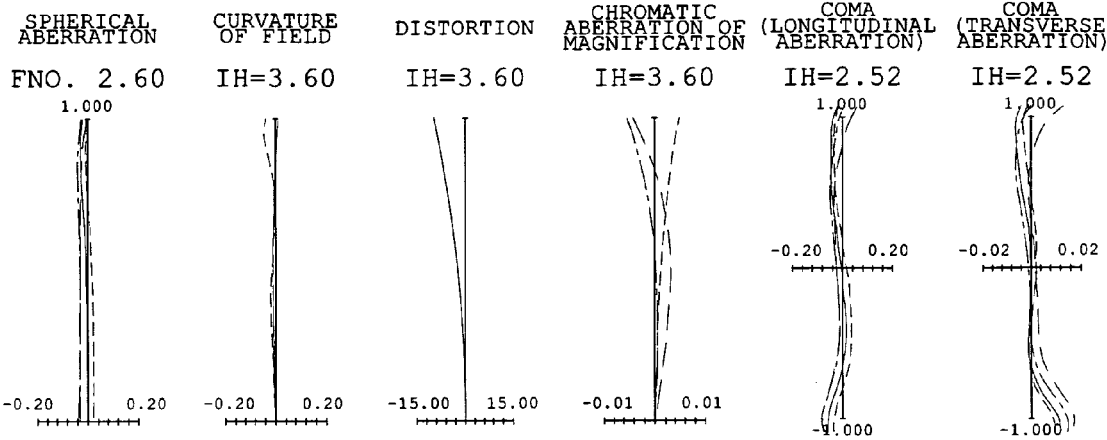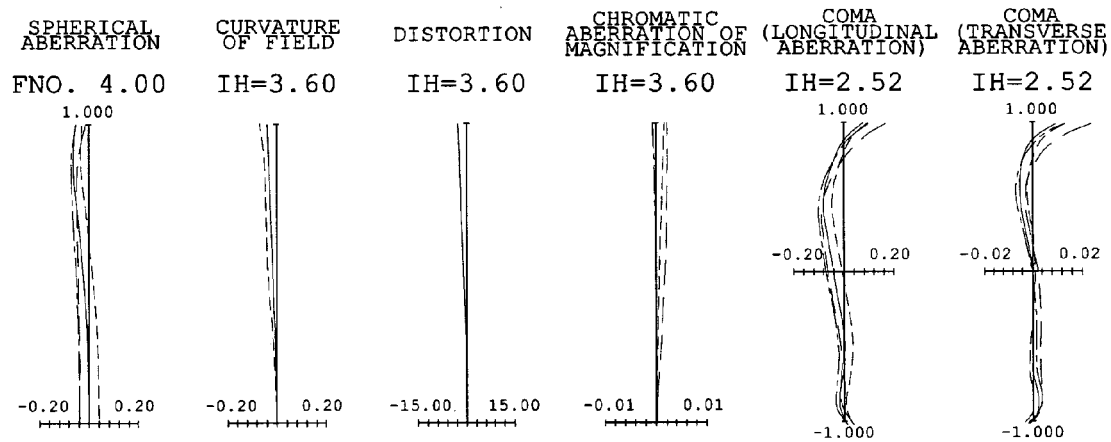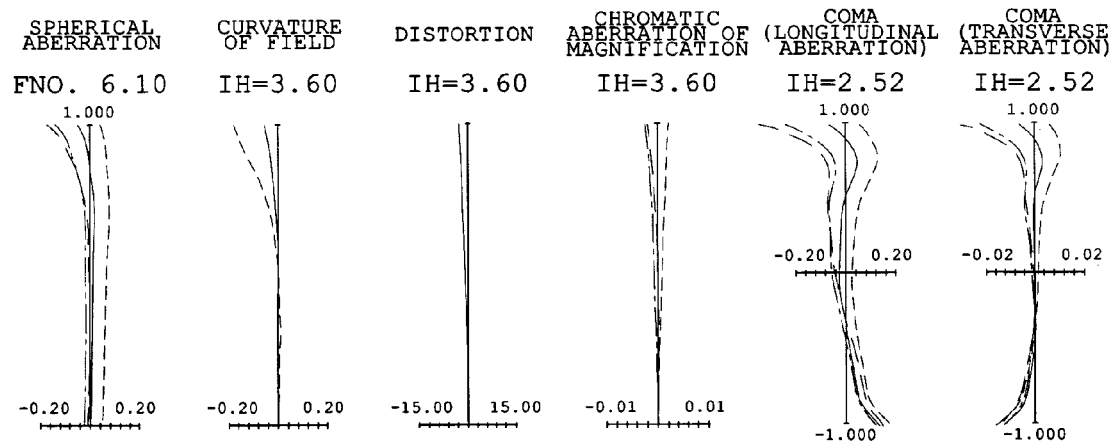

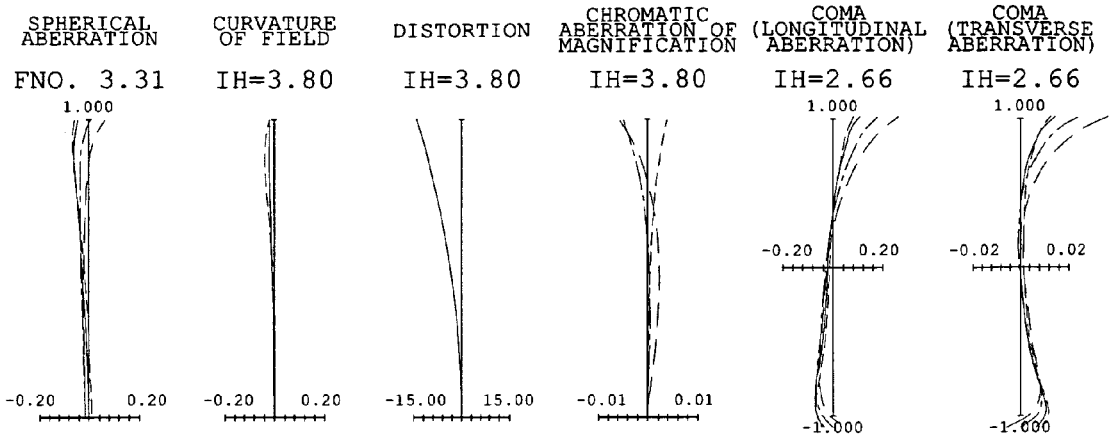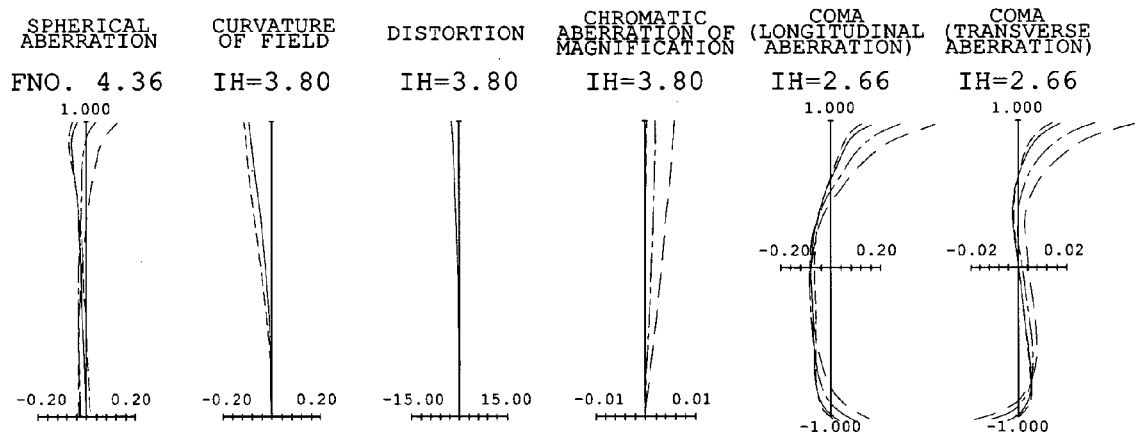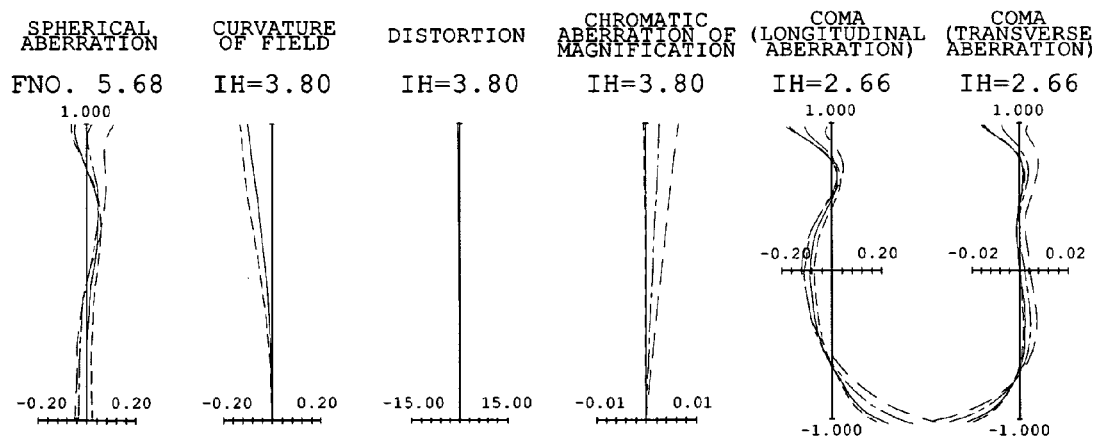

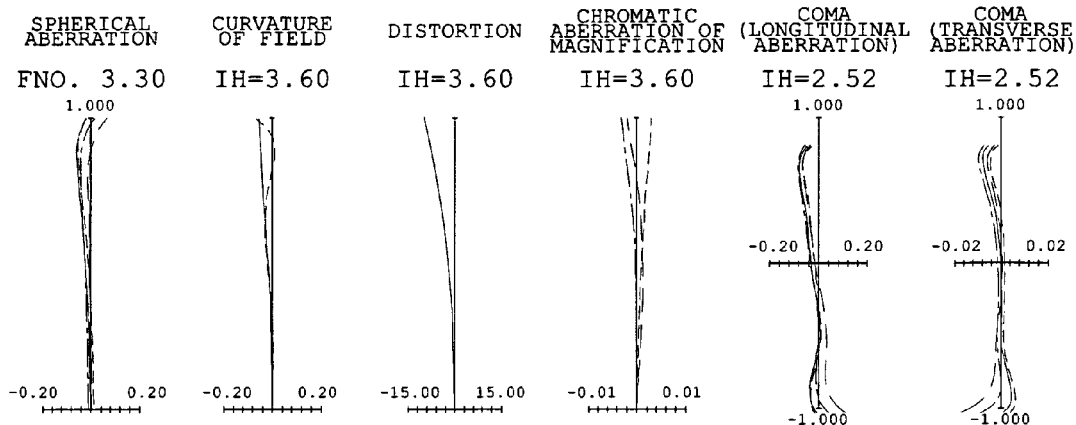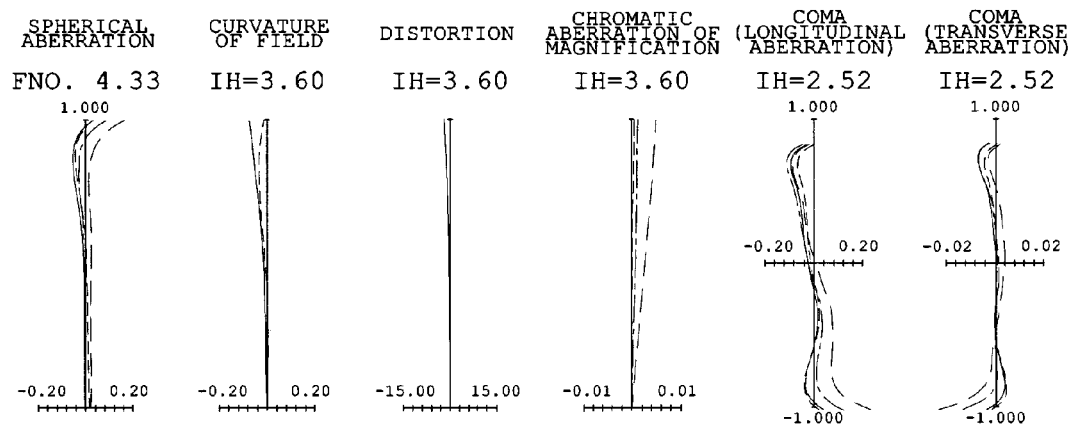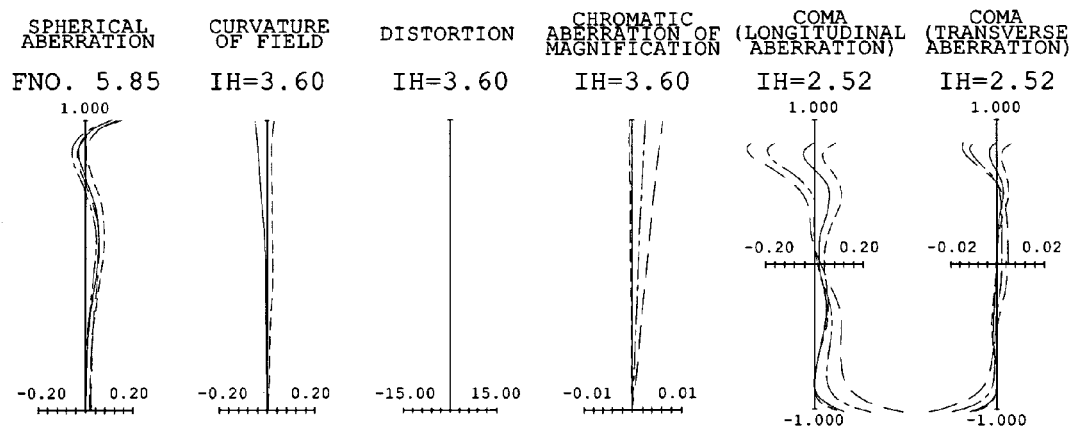

FIG.25A
FIG.25B
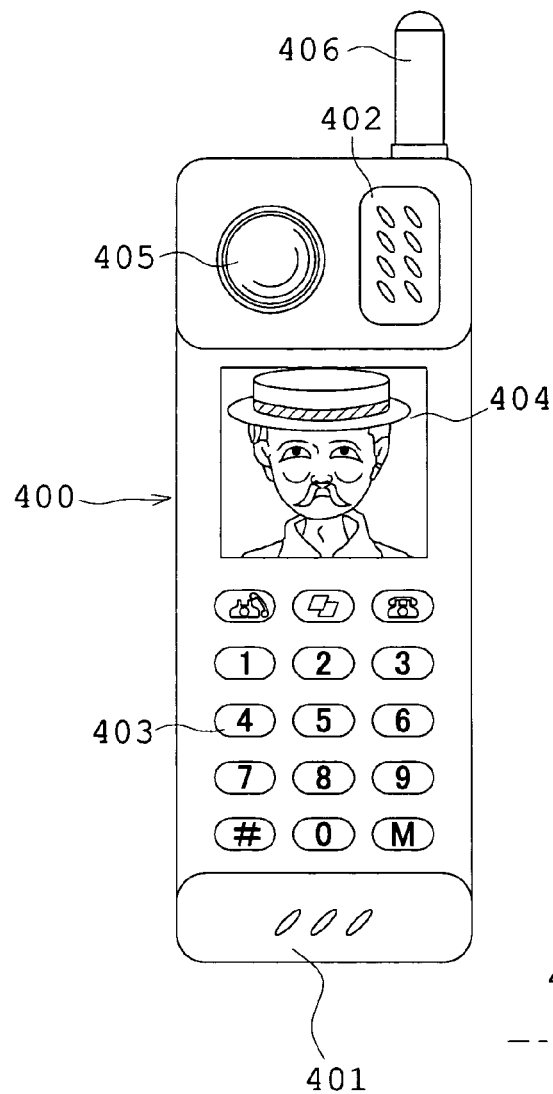
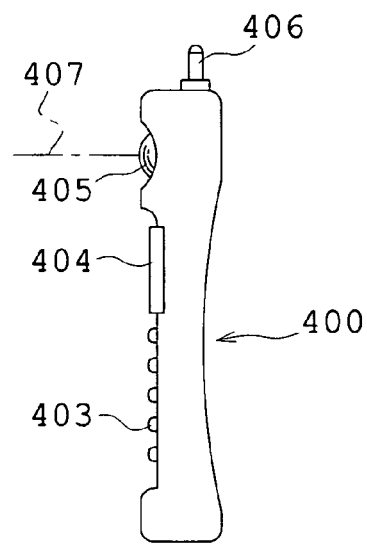
FIG.25C
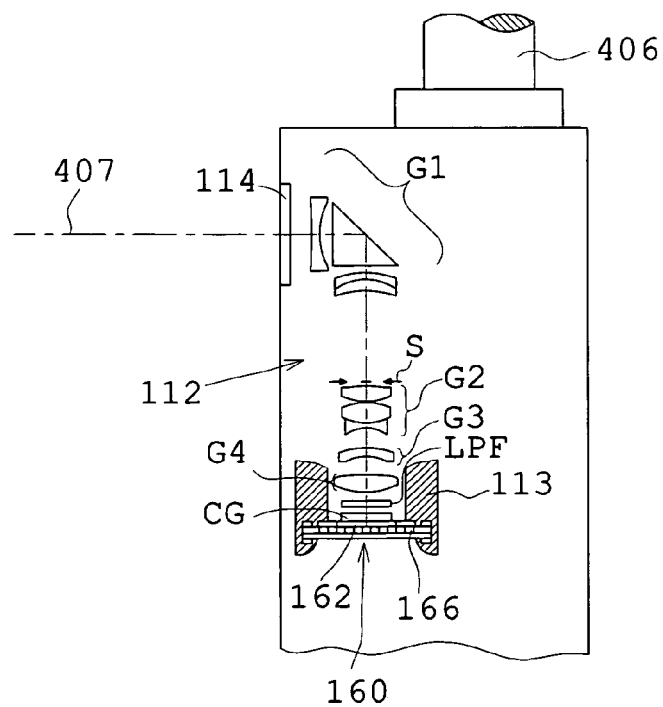

ELECTRONIC IMAGING APPARATUS

This application claims benefits of Japanese Application No. 2005-103053 filed in Japan on Mar. 31, 2005, the contents of which are hereby incorporated by reference.

BACKGROUND OF THE INVENTION

1. Field of the Invention

This invention relates to a zoom lens and an electronic imaging apparatus using the zoom lens, and in particular, to an electronic imaging apparatus, including a video camera or a digital camera, in which a slim design regarding a depth direction is attained.

2. Description of Related Art

Recently, special attention has been devoted to digital cameras (electronic cameras) as the next generation cameras that are an alternative to cameras for silver halide 35 mm films (135 formats). The digital cameras have come to have many categories in a wide range from a high-function type for business use to a popular portable type.

The greatest obstacle to a reduction in depth of a camera is the thickness of an optical system, notably extending from the most object-side surface of a zoom lens system to an imaging surface.

The main current of a slim design technique for a camera body in recent years is to adopt a so-called collapsible lens barrel in which the optical system protrudes from the camera body in photography, but when the camera is carried, it is incorporated in the camera body. Examples of optical systems, each having the possibility that the collapsible lens barrel is adopted and the slim design can be effectively attained, are set forth in References 1-3 described below. Each of these optical systems includes, in order from the object side, a first lens unit with negative refracting power and a second lens unit with positive refracting power, which are moved together when the magnification of the optical system is changed.

Reference 1: Japanese Patent Kokai No. Hei 10-213745
Reference 2: Japanese Patent Kokai No. 2002-72095
Reference 3: Japanese Patent Kokai No. 2002-90624
Reference 4: Japanese Patent Kokai No. 2004-4533
Reference 5: Japanese Patent Kokai No. 2004-264343
Reference 6: Japanese Patent Kokai No. 2004-163477

Zoom optical systems in which the optical path (the optical axis) of the optical system can easily be bent by a reflection optical element such as a mirror are set forth in References 4-6. In particular, Reference 5 discloses the addition of an image processing step of electrically processing image data obtained by an electronic image sensor to change the shape thereof.

However, there are particular demands for a zoom ratio of at least 3, a further decrease in depth, a reduction of the overall length of the optical system or housing dimensions, and a further improvement on compactness of the entire camera. In addition, there is a demand that, in a collapsible type, the compact design of the entire body should be attained by reducing the diameter of a front lens to make the lens barrel compact.

SUMMARY OF THE INVENTION

The electronic imaging apparatus according to the present invention comprises a zoom optical system including, in order from the object side, a first lens unit with negative power and a second lens unit with positive power, in which lens components having refracting power in the first lens unit are only a single biconcave negative lens element located at the most object-side position and a positive lens component located at the most image-side position; an electronic image sensor placed on the image side of the zoom optical system; and an image processing section electrically processing image data obtained by the electronic image sensor to change the shape thereof. The zoom lens system satisfies the following conditions in focusing of a nearly infinite object point:

$$0.85 < |y_{07}/(f_w \cdot \tan \omega_{07w})| < 0.97 \quad (1)$$

$$0.75 < |y_{10}/(f_w \cdot \tan \omega_{10w})| < 0.93 \quad (2)$$

where $f_w$ is the focal length of the entire zoom optical system at a wide-angle position, $y_{10}$ is a distance from the center of an effective imaging surface (an imageable surface) to a point furthest from the center (the maximum image height) of the electronic image sensor, $y_{07}$ is an image height expressed by $0.7\, y_{10}$, $\omega_{07w}$ is an angle made by a direction of an object point corresponding to an image point, connecting the center of the effective imaging surface of the electronic image sensor at the wide-angle position and the position of the image height $y_{07}$, with the optical axis, and a lens component is such that only the most object-side surface and the most image-side surface thereof come in contact with air and there is no air spacing between them, taking a single lens element or a cemented lens component as one unit.

In the electronic imaging apparatus according to the present invention, the zoom optical system preferably satisfies the following condition in focusing of a nearly infinite object point:

$$0.03 < |y_{07}/(f_w \cdot \tan \omega_{07w}) - y_{10}/(f_w \cdot \tan \omega_{10w})| < 0.15 \quad (3)$$

In the electronic imaging apparatus according to the present invention, the zoom optical system preferably satisfies the following condition in focusing of a nearly infinite object point:

$$0.33 < (R_1 + R_2)/(R_1 - R_2) < 0.93 \quad (4)$$

where $R_1$ is the radius of curvature of the object-side surface of the single negative lens element in the first lens unit and $R_2$ is the radius of curvature of the image-side surface of the single negative lens element in the first lens unit.

In the electronic imaging apparatus according to the present invention, the zoom optical system preferably satisfies the following condition in focusing of a nearly infinite object point:

$$N_{dA} > 1.70 \quad (5)$$

where $n_{dA}$ is a refractive-index relating to the d line (587.56 nm) of the single negative lens element in the first lens unit.

The electronic imaging apparatus preferably satisfies the following condition:

$$-3.1 < f_1/f_w < -1.5 \quad (6)$$

where $f_1$ is the focal length of the first lens unit.

The electronic imaging apparatus preferably satisfies the following condition:

$$-0.85 < (R_3 - R_4)/(R_3 + R_4) < -0.008 \quad (7)$$

where $R_3$ is the radius of curvature of the most object-side surface of the positive lens component in the first lens unit and $R_4$ is the radius of curvature of the most image-side surface of the positive lens component in the first lens unit.

In the electronic imaging apparatus according to the present invention, the first lens unit preferably includes, in order from the object side, the single biconcave negative lens element, a reflecting member, and the positive lens component.

In the electronic imaging apparatus according to the present invention, the first lens unit preferably includes, in order from the object side, the single biconcave negative lens element and the positive lens component.

In the electronic imaging apparatus according to the present invention, the positive lens component is preferably a single positive lens element.

In the electronic imaging apparatus according to the present invention, the positive lens component is preferably a cemented lens of a single negative lens element and a single positive lens element.

In the electronic imaging apparatus according to the present invention, a zoom unit preferably includes the first lens unit and the second lens unit, and only these two lens units are moved to thereby change the focal length.

In the electronic imaging apparatus according to the present invention, the zoom unit preferably includes, in order from the object side, the first lens unit, the second lens unit, and a third lens unit consisting of a single lens element, and at least the first lens unit and the second lens unit are moved to thereby change the focal length.

In the electronic imaging apparatus according to the present invention, only the first lens unit, the second lens unit, and the third lens unit are preferably moved to thereby change the focal length.

These and other features and advantages of the present invention will become apparent from the following detailed description of the preferred embodiments when taken in conjunction with the accompanying drawings.

BRIEF DESCRIPTION OF THE DRAWINGS

FIGS. 4A, 4B, 4C, 4D, 4E, and 4F are diagrams showing aberration characteristics at the wide-angle position of the zoom optical system of the first embodiment;

FIGS. 4G, 4H, 4I, 4J, 4K, and 4L are diagrams showing aberration characteristics at the middle position of the zoom optical system of the first embodiment;

FIGS. 4M 4N, 4O, 4P, 4Q, and 4R are diagrams showing aberration characteristics at the telephoto position of the zoom optical system of the first embodiment;

FIGS. 6A, 6B, 6C, 6D, 6E, and 6F are diagrams showing aberration characteristics at the wide-angle position of the zoom optical system of the second embodiment;

FIGS. 6G, 6H, 6I, 6J, 6K, and 6L are diagrams showing aberration characteristics at the middle position of the zoom optical system of the second embodiment;

FIGS. 6M 6N, 6O, 6P, 6Q, and 6R are diagrams showing aberration characteristics at the telephoto position of the zoom optical system of the second embodiment;

FIGS. 8A, 8B, 8C, 8D, 8E, and 8F are diagrams showing aberration characteristics at the wide-angle position of the zoom optical system of the third embodiment;

FIGS. 8G, 8H, 8I, 8J, 8K, and 8L are diagrams showing aberration characteristics at the middle position of the zoom optical system of the third embodiment;

FIGS. 8M 8N, 8O, 8P, 8Q, and 8R are diagrams showing aberration characteristics at the telephoto position of the zoom optical system of the third embodiment;

FIGS. 10A, 10B, 10C, 10D, 10E, and 10F are diagrams showing aberration characteristics at the wide-angle position of the zoom optical system of the fourth embodiment;

FIGS. 10G, 10H, 10I, 10J, 10K, and 10L are diagrams showing aberration characteristics at the middle position of the zoom optical system of the fourth embodiment;

FIGS. 10M, 10N, 10O, 10P, 10Q, and 10R are diagrams showing aberration characteristics at the telephoto position of the zoom optical system of the fourth embodiment;

FIGS. 12A, 12B, 12C, 12D, 12E, and 12F are diagrams showing aberration characteristics at the wide-angle position of the zoom optical system of the fifth embodiment;

FIGS. 12G, 12H, 12I, 12J, 12K, and 12L are diagrams showing aberration characteristics at the middle position of the zoom optical system of the fifth embodiment;

FIGS. 12M, 12N, 12O, 12P, 12Q, and 12R are diagrams showing aberration characteristics at the telephoto position of the zoom optical system of the fifth embodiment;

FIGS. 14A, 14B, 14C, 14D, 14E, and 14F are diagrams showing aberration characteristics at the wide-angle position of the zoom optical system of the sixth embodiment;

FIGS. 14G, 14H, 14I, 14J, 14K, and 14L are diagrams showing aberration characteristics at the middle position of the zoom optical system of the sixth embodiment;

FIGS. 14M, 14N, 14O, 14P, 14Q, and 14R are diagrams showing aberration characteristics at the telephoto position of the zoom optical system of the sixth embodiment;

FIG. 25A is a front view showing an example of a mobile phone incorporating the zoom optical system according to the present invention;

FIG. 25B is a side view showing the mobile phone of FIG. 25A; and

FIG. 25C is a sectional view showing the photographing optical system incorporated in the mobile phone of FIG. 25A.

DETAILED DESCRIPTION OF THE PREFERRED EMBODIMENTS

Figure 1:
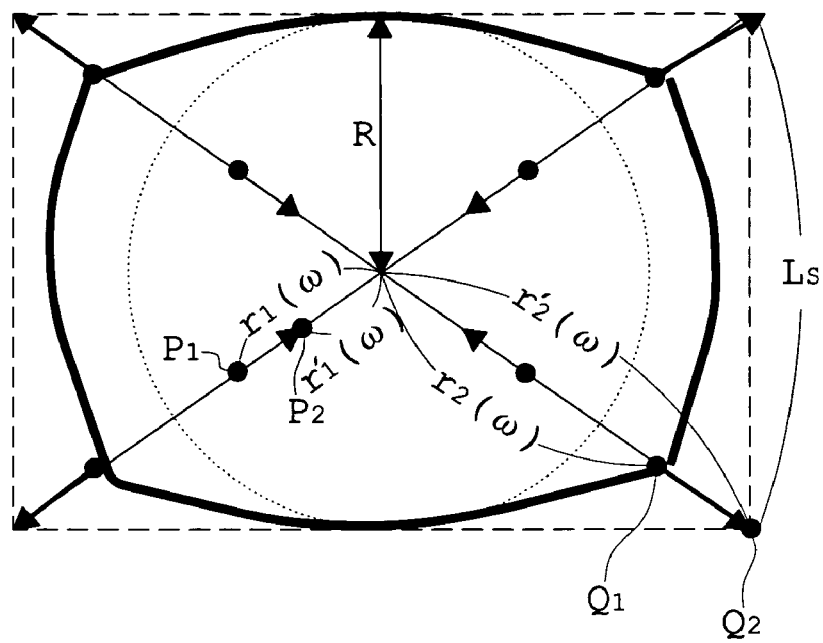
FIG. 1 is an explanatory view showing a fundamental conception for digitally correcting image distortion.

Before undertaking the description of the embodiments, the operation and effect of the present invention will be explained.

The electronic imaging apparatus according to the present invention comprises a zoom optical system including, in order from the object side, a first lens unit with negative power and a second lens unit with positive power, in which lens components having refracting power in the first lens unit are only a single biconcave negative lens element located at the most object-side position and a positive lens component located at the most image-side position; an electronic image sensor placed on the image side of the zoom optical system; and an image processing section electrically processing image data obtained by the electronic image sensor to change the shape thereof. The zoom optical system satisfies Conditions (1) and (2) in focusing of a nearly infinite object point.

According to the present invention, the single negative lens element located closest to an object point is configured as the biconcave lens element, and thereby an increase in lens thickness is suppressed, a negative power is strengthened, and a wider angle of view is obtained to contribute to downsizing of the lens diameter. In particular, the configuration of the biconcave lens element leads to effective correction for off-axis chromatic aberration and coma at the wide-angle position. Distortion for which correction becomes difficult here is corrected by the image processing section and thereby the quality of the entire image is improved. (In the image processing section, correction for distortion, in contrast with correction for coma, is capable of reducing a load imposed on the system.) That is, in this arrangement, downsizing of the front lens diameter of the optical system and correction for coma are effectively performed, and distortion can be effectively corrected at the same time the deterioration of the quality of the entire image is suppressed by image processing.

Below the lower limit of each of Conditions (1) and (2), distortion of the image is increased, and in correction by electric image processing, the deterioration of the resolution of the image on its periphery becomes pronounced. Beyond the upper limit, the diameter and thickness of each lens unit become large.

In this case, it is more desirable to satisfy the following conditions:

$$0.85 < |y_{07}/(f_w \cdot \tan \omega_{07w})| < 0.96 \qquad (1')$$

$$0.75 < |y_{10}/(f_w \cdot \tan \omega_{10w})| < 0.91 \qquad (2')$$

The electronic imaging apparatus according to the present invention preferably satisfies Condition (3) in focusing of the nearly infinite object point.

By satisfying Condition (3), a good balance between the suppression of influence of the deterioration of the image quality due to the electric image processing and the compact design of the optical system can be held. Below the lower limit of Condition (3), the diameter and thickness of each lens unit become large, while beyond the upper limit, the deterioration of the image quality on the image periphery becomes pronounced due to the electric image processing.

In this case, it is more desirable to satisfy the following condition:

$$0.05 < |y_{07}/(f_w \cdot \tan \omega_{07w}) - y_{10}/(f_w \cdot \tan \omega_{10w})| < 0.10 \qquad (3')$$

The electronic imaging apparatus according to the present invention preferably satisfies Condition (4) in focusing of the nearly infinite object point.

Condition (4) expresses the shape of the single negative lens element. Below the lower limit, the sag amount of the radius of curvature $R_1$ is increased and the lens thickness becomes large. Alternatively, the power of the radius of curvature $R_2$ is lessened and it becomes difficult to ensure a satisfactory angle of view. Beyond the upper limit, the sag amount of the radius of curvature $R_2$ is increased and the thickness of the first lens unit becomes large, or the power of the radius of curvature $R_1$ is lessened and it becomes difficult to ensure a satisfactory angle of view.

In this case, it is more desirable to satisfy the following condition:

$$0.5 < (R_1 + R_2)/(R_1 - R_2) < 0.93 \qquad (4')$$

It is further desirable to satisfy the following condition:

$$0.4 < (R_1 + R_2)/(R_1 - R_2) < 0.88 \qquad (4'')$$

The electronic imaging apparatus according to the present invention preferably satisfies Condition (5) in focusing of the nearly infinite object point.

Condition (5) determines the refractive index of the single negative lens element and is favorable for the compact design because the sag amounts of the radii of curvature $R_1$ and $R_2$ can be made smaller by satisfying this condition. In particular, it also has effects on correction for coma and downsizing of the front lens diameter.

The electronic imaging apparatus according to the present invention preferably satisfies Condition (6).

Condition (6) determines the ratio of the focal length of the first lens unit to the focal length of the entire system at the wide-angle position. Below the lower limit, the power of the first lens unit is extremely weakened and it becomes difficult to make the diameter and thickness of the first lens unit smaller. Beyond the upper limit, the power of the first lens unit is extremely strengthened and thus this is unfavorable for correction for aberration.

The electronic imaging apparatus according to the present invention preferably satisfies Condition (7).

Condition (7) expresses the shape of the positive lens component. Below the lower limit, it becomes hard to further decrease the thickness of the positive lens component. Beyond the upper limit, refraction by the surface of the radius of curvature R4 becomes so strong that it becomes difficult to favorably correct spherical aberration and coma.

In the electronic imaging apparatus according to the present invention, the first lens unit preferably includes, in order from the object side, a single biconcave negative lens element, a reflecting member, and a positive lens component.

The imaging apparatus can be constructed so that the optical axis is bent by the reflecting member in the first lens unit and thereby a lens section is not extended from the imaging apparatus. This is convenient for the slim design of the imaging apparatus and a reduction of setup time from switching the power source on. It is also convenient for water-and dust-proof design.

In the electronic imaging apparatus according to the present invention, the first lens unit preferably includes, in order from the object side, a single biconcave negative lens element and a positive lens component. In view of cost, performance, and the degree of ease or difficulty of manufacture, this arrangement is best in balance and is advantageous for a lightweight design.

In the electronic imaging apparatus according to the present invention, the positive lens component is preferably a single positive lens element. Whereby, this arrangement is advantageous for cost and compactness.

In the electronic imaging apparatus according to the present invention, the positive lens component is preferably a cemented lens component of a single negative lens element and a single positive lens element. Whereby, in particular, chromatic aberration of magnification can be favorably corrected.

In the electronic imaging apparatus according to the present invention, a zoom unit preferably includes the first lens unit and the second lens unit, and only these two lens units are moved to thereby change the focal length. Whereby, a camera which has a simple structure and is compact can be constructed.

In the electronic imaging apparatus according to the present invention, the zoom unit preferably includes, in order from the object side, the first lens unit, the second lens unit, and a third lens unit consisting of a single lens element, and at least the first lens unit and the second lens unit are moved to thereby change the focal length, or only the first lens unit, the second lens unit, and the third lens unit are moved to thereby change the focal length. Whereby, a further compact camera can be constructed with a small number of lenses or with a high variable magnification lens system.

In general, as the angle of view at the wide-angle position is increased or the zoom ratio is raised, the front lens diameter against the image height enlarges.

Here, a description will be given of a fundamental conception for digitally correcting image distortion.

For example, as shown in FIG. 1, the magnification on a circle (image height) of a radius R coming into contact with the major sides of the effective imaging surface is made constant, with an intersection of the optical axis and the imaging surface as a center, and this circle is used as a reference of correction. Individual points on circles (image heights) of given radii r ($\omega$) other than the radius R are almost radially moved. In this case, the individual points are moved concentrically so that the radii r ($\omega$) become radii r' ($\omega$). By doing so, the image distortion is corrected. For example, a point $P_1$ on the circle of a given radius $r_1$ ($\omega$) located inside the circle of the radius R is moved to a point $P_2$ on the circle of a radius $r_1'$ ($\omega$) to be corrected toward the center of the circle. A point $Q_1$ on the circle of a given radius $r_2$ ($\omega$) located outside the circle of the radius R is moved to a point $Q_2$ on the circle of a radius $r_2'$ ($\omega$) to be corrected in a direction separating from the center of the circle.

Here, the radius r' ($\omega$) can be expressed as follows:

$$r'(\omega) = \alpha f \tan \omega \quad (0 \leq \alpha \leq 1)$$

where $\omega$ is the half angle of view of the object and f is the focal length of an imaging optical system (the zoom optical system in the present invention).

Here, when an ideal image height corresponding to a point on the circle (the image height) of the radius R is represented by Y, the following relation is obtained:

$$\alpha = R/Y = R/f \tan \omega$$

Ideally, the optical system is rotationally symmetrical about the optical axis. Hence, distortion is also produced rotationally symmetrical about the optical axis. Thus, when distortion optically produced is electrically corrected as mentioned above, the magnification on the circle (the image height) of the radius R coming into contact with the major sides of the effective imaging surface is made constant, with an intersection of the optical axis and the imaging surface as a center, on a reproduced image. Then, individual points on the circles (image heights) of the radii r ($\omega$) other than the radius R are almost radially moved. In this case, the individual points are moved concentrically so that the radii r ($\omega$) become radii r' ($\omega$). By doing so, when the image distortion can be corrected, it is considered that this is advantageous for amounts of data and calculation. However, an optical image, when formed on the electronic image sensor, ceases to be continuous (for sampling). Strictly speaking, therefore, unless the pixels of the electronic image sensor are radially arrayed, the circle of the radius R drawn on the optical image ceases to be accurate at all. That is, in the shape correction of the image data indicated by individual points of discrete coordinates, there is no circle that the magnification can be made constant. It is thus good practice to use a method of determining coordinates (Xi', Yj') of a moved point in accordance with coordinates (Xi, Yj) of each pixel. When at least two points of the coordinates (Xi, Yj) are moved to the coordinates (Xi', Yj'), the average value of coordinates of pixels is taken. When there is no moving point, it is only necessary that the values of the coordinates (Xi', Yj') of some surrounding pixels are used for interpolation.

Such a method is particularly effective for correction where considerable image distortion is produced with respect to the optical axis because of manufacturing errors of the optical system and the electronic image sensor, and the circle of the radius R drawn on the optical image becomes asymmetrical. This method is also effective for correction where, in the image sensor or various output devices, geometrical distortion is produced when a signal is reproduced as an image. When a toric surface or other rotationally asymmetrical surfaces are applied, the prism can be further downsized and a further slim design of the electronic imaging apparatus is possible. In this case also, this correcting method is effective.

In order to calculate the amount of correction, r' ($\omega$)-r ($\omega$), the electronic imaging apparatus of the present invention may be constructed so that the relationship between the radius r (ω), namely the half angle of view and the image height or between a real image height r and an ideal image height r'/α is recorded in a recording medium housed in the electronic imaging apparatus.

Also, in order to obtain an image after correction for distortion so that the amount of light does not suffer a serious shortage at both ends of the minor sides, it is favorable that the radius R satisfies the following condition:

$$0 \leq R \leq 0.6 \, Ls$$

where Ls is the length of the minor side of the effective imaging surface.

The radius R should preferably satisfy the following condition:

$$0.3 \, Ls \leq R \leq 0.6 \, Ls$$

It is most advantageous that the radius R is made to practically coincide with the radius of a circle coming into contact with the minor sides of the effective imaging surface. Also, when correction is made by holding the magnification constant in the proximity of the radius R=0, namely in axial proximity, the effect of a compact design can be ensured even in a wide-angle design, although somewhat disadvantageous for a substantial number of images.

Also, a focal-length section requiring correction is divided into some focal zones. Correction may be made by the same amount of correction that the result of correction practically satisfying the following relation is obtained in the proximity of the telephoto position within each of divided focal zones:

$$r'(\omega) = \alpha f \tan \omega$$

In this case, however, the amount of barrel distortion remains to some extent at the wide-angle position in each divided focal zone. If the number of divided zones is increased, inherent data required for correction must be excessively stored in the recording medium, which is not very favorable. Thus, one or several coefficients relating to the focal length in each divided focal zone are previously calculated. It is only necessary that such a coefficient is determined on the basis of the measurement by a simulation or actual equipment. The amount of correction is calculated so that the result of correction practically satisfying the following relation is obtained in the proximity of the telephoto position within each divided focal zones:

$$r'(\omega) = \alpha f \tan \omega$$

The amount of correction may be evenly multiplied by the coefficient in accordance with the focal length to obtain the final amount of correction.

When an image obtained by imaging an infinite object is free of distortion, the following relation is established:

$$f = y / \tan \omega$$

where y is a height of an image point from the optical axis (an image height) and ω is an angle (a half angle of view of the object) made by a direction of an object point corresponding to an image point, connecting the center of the effective imaging surface and the position of the image height y, with the optical axis.

When barrel distortion is produced in the imaging system, the following condition is set:

$$f > y / \tan \omega$$

That is, when the focal length f and the image height y are made constant, the value of the angle ω becomes large.

Condition (1) determines the extent of barrel distortion at the wide-angle position in the zoom optical system.

Figure 2:
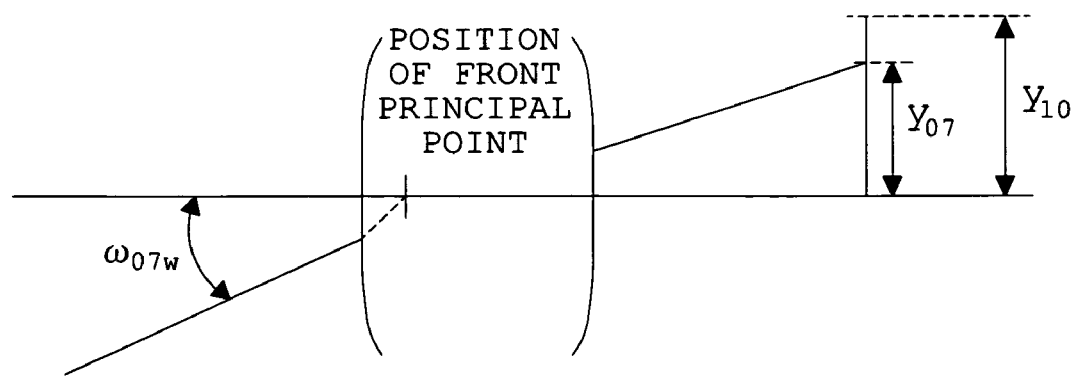
FIG. 2 is an explanatory view showing the relationship between an angle of incidence of light made with the optical axis and an image height.

More specifically, as shown in FIG. 2, $\omega_{07w}$ is an angle on the object side, made by the chief ray passing through the point of the image height $y_{07}$ with the optical axis, that is, an angle made by the chief ray directed toward the position of the front principal point of the zoom optical system from the object side with the optical axis.

When the zoom optical system satisfies Condition (1), the compact design of the optical system is maintained and at the same time, an image can be obtained over a wide field of view. Furthermore, when the image is processed through the signal processing system incorporated in the electronic imaging apparatus, image distortion caused by aberration of the optical system can be corrected without increasing an enlargement ratio in a radial direction on an image periphery or recognizing the deterioration of sharpness on the image periphery.

In the present invention, distortion is intentionally produced in the optical system, and the image, after being picked up by the electronic image sensor, is electrically processed so that distortion is corrected. This is done for the purpose of fulfilling the compact design, the wide-angle design, and the high variable magnification design of the optical system. In the present invention, therefore, it is also important that the optical system is chosen so that it does not have unnecessary size.

In accordance with the drawings and numerical data, the embodiments of the present invention will be described below.

First Embodiment

Figure 3A:
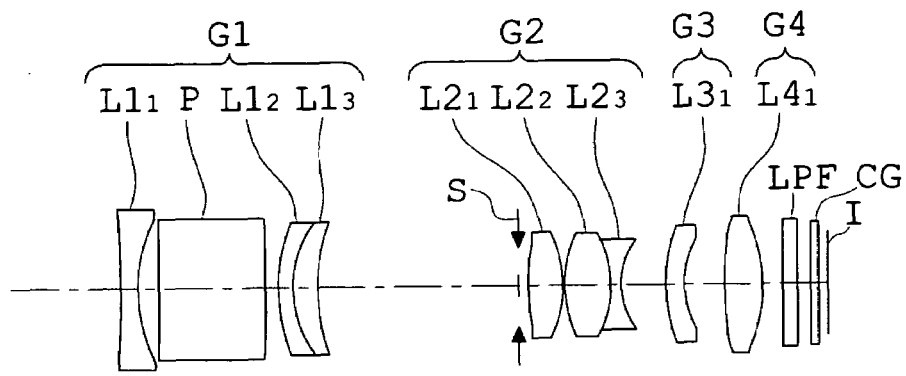
FIGS. 3A, 3B, and 3C are sectional views showing lens arrangements, developed along the optical axis, at wide-angle, middle, and telephoto positions, respectively, of the zoom optical system of a first embodiment in the present invention.
Figure 3B:
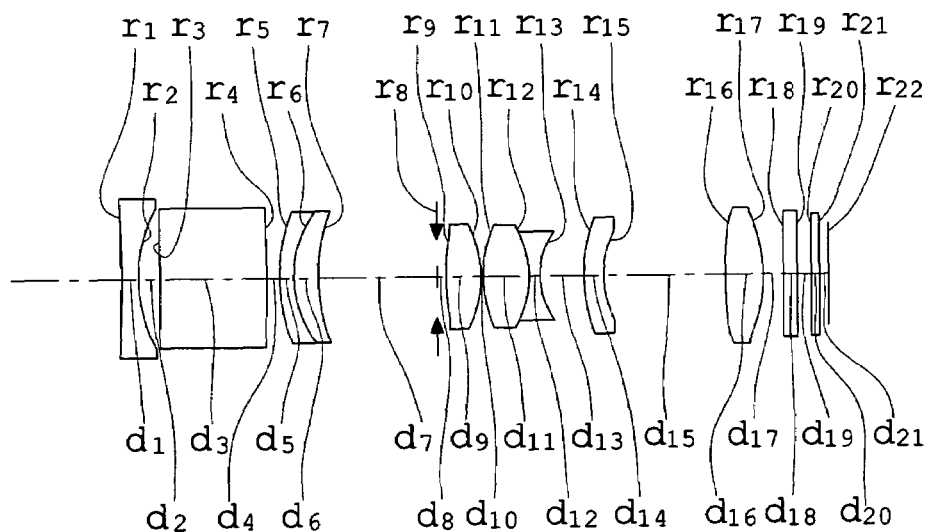
Figure 3C:
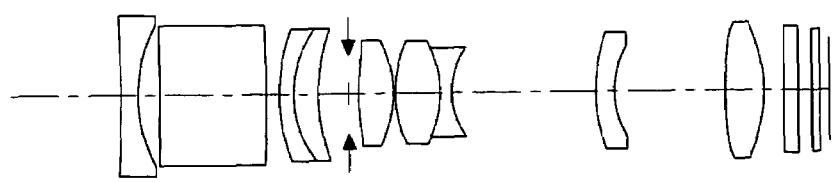

FIGS. 3A-3C show lens arrangements of the first embodiment of the zoom optical system according to the present invention. FIGS. 4A-4R show aberration characteristics of the zoom optical system in the first embodiment.

A four-lens-unit zoom optical system of the first embodiment comprises, in order from the object side, a first lens unit G1 with negative power, an aperture stop S, a second lens unit G2 with positive power, a third lens unit G3 with negative power, and a fourth lens unit G4 with positive power. Reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power, an optical path-bending prism P, and a cemented lens of a second lens $L1_2$ with negative power and a third lens $L1_3$ with positive power. The first lens $L1_1$ with negative power is a biconcave lens whose image-side surface is aspherical. The second lens $L1_2$ with negative power is a meniscus lens with a convex surface facing the object side. The third lens $L1_3$ with positive power is also a meniscus lens with a convex surface facing the object side.

The second lens unit G2 with positive power includes, in order from the object side, a first lens $L2_1$ with positive power, both surfaces of which are aspherical, and a cemented lens of a second lens $L2_2$ with positive power and a third lens $L2_3$ with negative power. The first lens $L2_1$ with positive power is a biconvex lens, the second lens $L2_2$ with positive power is a biconvex lens, and the third lens $L2_3$ with negative power is a biconcave negative lens.

The third lens unit G3 with negative power is constructed with a single negative meniscus lens $L3_1$ with a convex surface facing the object side.

The fourth lens unit G4 with positive power is constructed with a single biconvex positive lens $L4_1$ whose both surfaces are aspherical.

The first embodiment adopts a zoom system that, upon zooming from the wide-angle position to the telephoto position, the second and third lens units G2 and G3 are moved toward the object side and then the third lens unit G3 is moved toward the image side so that spacing between the first lens unit G1 and the second lens unit G2 is narrowed and spacing between the third lens unit G3 and the fourth lens unit G4 is widened. That is, the first lens unit G1 and the fourth lens unit G4 are fixed, the second lens unit G2 is continuously moved toward the object side, and the third lens unit G3 is moved along a locus that is convex toward the object side. The stop S is moved integrally with the second lens unit G2.

F-number; and ω, a half angle of view. Also, when z is taken as the coordinate in the direction of the optical axis, y is taken as the coordinate normal to the optical axis, r represents the radius of curvature of each lens surface, k represents a conic constant, and A4, A6, A8, A10, and A12 represent aspherical coefficients, the configuration of the aspherical surface is expressed by the following equation:

$$z = (y^2/r)/[1+\{-(1+k)\times(y/r)^2\}^{1/2}] + A4y^4 + A6y^6 + A8y^8 + A10y^{10} + A12y^{12}$$

Also, for example, the aspherical coefficient, A4=−1.31300e−04, can also be expressed as A4=−1.31300×10$^4$, but in the numerical data of the embodiment, the aspherical coefficient is expressed in the former form.

These symbols and expression forms are also used for the numerical data of individual embodiments to be described later.

| Face No. | R | D | Nd | Vd |
|---|---|---|---|---|
| | f = 6.45~18.62 mm FNO = 3.2~6.0 2ω = 63.6°~21.4° | | | |
| 1 | −67.100 | 1.20 | 1.81474 | 37.03 |
| 2 | 9.884 (aspherical surface) | 1.50 | | |
| 3 | ∞ | 7.30 | 1.80400 | 46.57 |
| 4 | ∞ | 0.80 | | |
| 5 | 12.008 | 1.00 | 1.72916 | 54.68 |
| 6 | 7.519 | 1.69 | 1.84666 | 23.78 |
| 7 | 12.236 | D7 | | |
| 8 | ∞ (stop) | 0.70 | | |
| 9 | 10.781 (aspherical surface) | 2.43 | 1.58913 | 61.25 |
| 10 | −10.394 (aspherical surface) | 0.10 | | |
| 11 | 8.942 | 3.05 | 1.81600 | 46.62 |
| 12 | −8.006 | 0.73 | 1.90366 | 31.31 |
| 13 | 5.267 | D13 | | |
| 14 | 11.734 | 1.20 | 1.65160 | 58.55 |
| 15 | 6.220 | D15 | | |
| 16 | 23.546 (aspherical surface) | 2.70 | 1.52542 | 55.78 |
| 17 | −9.313 (aspherical surface) | 1.40 | | |
| 18 | ∞ | 0.88 | 1.54771 | 62.84 |
| 19 | ∞ | 0.89 | | |
| 20 | ∞ | 0.50 | 1.51633 | 64.14 |
| 21 | ∞ | 0.62 | | |
| 22 | ∞ (image plane) | | | |

Aspherical coefficients

| Face No. | R | k | A4 | A6 | A8 | A10 | A12 |
|---|---|---|---|---|---|---|---|
| 2 | 9.884 | 0.000 | −1.31300e−04 | 2.97528e−05 | −2.75471e−06 | 1.20347e−07 | −2.02603e−09 |
| 9 | 10.781 | 0.000 | −7.58378e−04 | −5.07344e−05 | 1.86460e−06 | −3.68215e−07 | |
| 10 | −10.394 | 0.000 | −3.63767e−04 | −4.26261e−05 | 4.29324e−07 | −1.75891e−07 | |
| 16 | 23.546 | 0.000 | −6.23936e−04 | 1.37158e−04 | −1.02433e−05 | 2.65418e−07 | |
| 17 | −9.313 | 0.000 | −1.64033e−04 | 8.38956e−05 | −2.36184e−06 | −2.14260e−07 | 9.65083e−09 |

Zoom data

| | Wide-angle position | Middle position | Telephoto position |
|---|---|---|---|
| Focal length | 6.454 | 10.602 | 18.615 |
| FNO | 3.22 | 4.40 | 6.03 |
| Angle of view(2ω) | 63.6° | 38.3° | 21.4° |
| D7 | 13.61 | 8.07 | 2.00 |
| D13 | 3.00 | 3.09 | 9.80 |
| D15 | 2.73 | 8.18 | 7.53 |

Figure 5A:
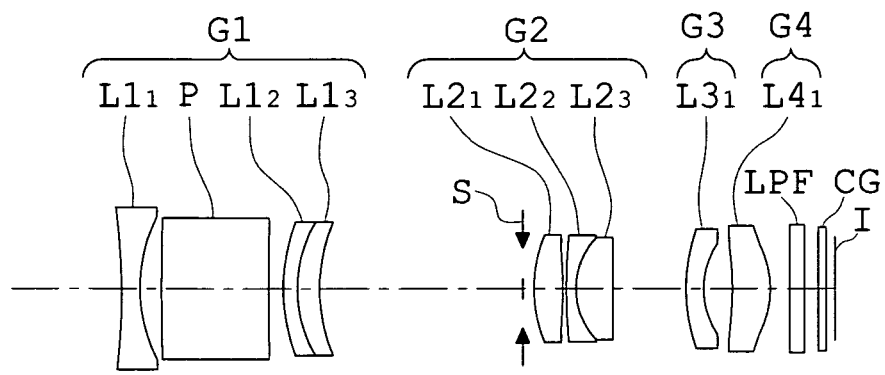
FIGS. 5A, 5B, and 5C are sectional views showing lens arrangements, developed along the optical axis, at wide-angle, middle, and telephoto positions, respectively, of the zoom optical system of a second embodiment in the present invention.
Figure 5B:
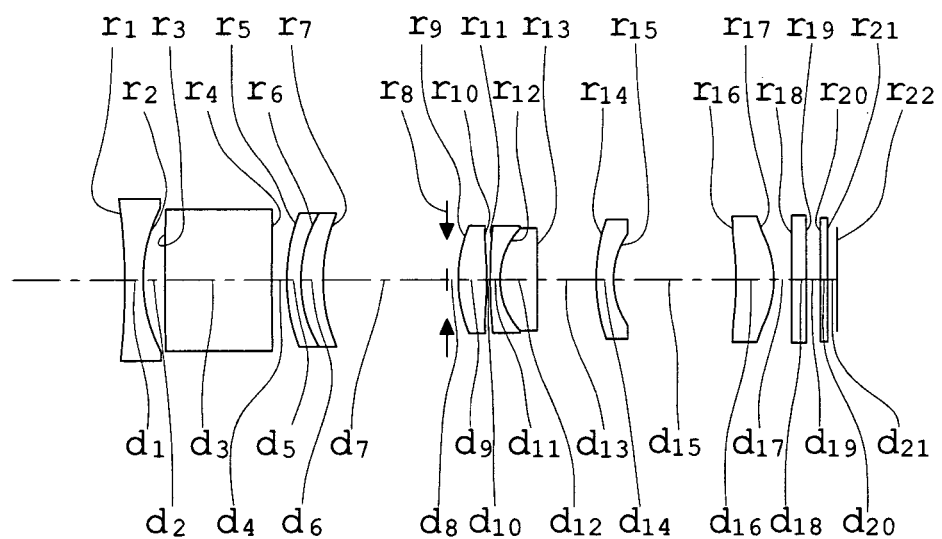
Figure 5C:
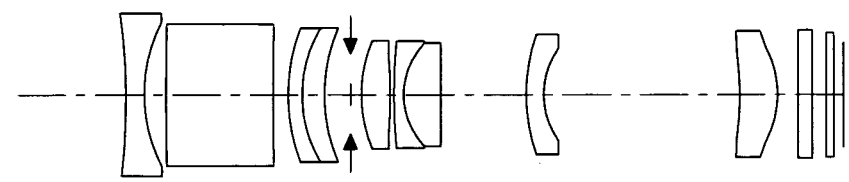

Subsequently, numerical data of optical members constituting the zoom optical system in the first embodiment are shown below. In the data, R denotes the radius of curvature of each of the surfaces of the optical members; D, spacing between the surfaces; Nd, the refractive index of each optical member relating to the d line; Vd, the Abbe's number of each optical member; f, the focal length; FNO, the Second Embodiment FIGS. 5A-5C show lens arrangements of the second embodiment of the zoom optical system according to the present invention. FIGS. 6A-6R show aberration characteristics of the zoom optical system in the second embodiment.

A four-lens-unit zoom optical system of the second embodiment comprises, in order from the object side, a first lens unit G1 with negative power, an aperture stop S, a second lens unit G2 with positive power, a third lens unit G3 with negative power, and a fourth lens unit G4 with positive power. Again, reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power, an optical path-bending prism P, and a cemented lens of a second lens $L1_2$ with negative power and a third lens $L1_3$ with positive power. The first lens $L1_1$ with negative power is a biconcave lens whose image-side surface is aspherical. The second lens $L1_2$ with negative power is a meniscus lens with a convex surface facing the object side. The third lens $L1_3$ with positive power is also a meniscus lens with a convex surface facing the object side.

The second lens unit G2 with positive power includes, in order from the object side, a first lens $L2_1$ with positive power, both surfaces of which are aspherical, and a cemented lens of a second lens $L2_2$ with negative power and a third lens $L2_3$ with positive power. The first lens $L2_1$ with positive power is a biconvex lens, the second lens $L2_2$ with negative power is a meniscus lens with a convex surface facing the object side, and the third lens $L2_3$ with positive power is a biconvex positive lens.

The third lens unit G3 with negative power is constructed with a single negative meniscus lens $L3_1$ with a convex surface facing the object side.

The fourth lens unit G4 with positive power is constructed with a single positive meniscus lens $L4_1$ whose both surfaces are aspherical, with a concave surface facing the object side.

The second embodiment adopts a zoom system that, upon zooming from the wide-angle position to the telephoto position, the first lens unit G1 and the fourth lens unit G4 are fixed and the second and third lens units G2 and G3 are continuously moved toward the object side so that the spacing between the first lens unit G1 and the second lens unit G2 is narrowed and the spacing between the third lens unit G3 and the fourth lens unit G4 is widened. The stop S is moved integrally with the second lens unit G2.

Subsequently, numerical data of optical members constituting the zoom optical system in the second embodiment are shown below.

| | f = 6.45~18.62 mm FNO = 3.1~5.9 2ω = 63.6°~20.9° | | | |
|---|---|---|---|---|
| Face No. | R | D | Nd | Vd |
| 1 | −34.972 | 1.20 | 1.76802 | 49.24 |
| 2 | 11.387 (aspherical surface) | 1.50 | | |
| 3 | ∞ | 7.30 | 1.80400 | 46.57 |
| 4 | ∞ | 1.00 | | |
| 5 | 11.379 | 1.00 | 1.69567 | 53.79 |
| 6 | 8.322 | 1.51 | 1.84666 | 23.78 |
| 7 | 11.648 | D7 | | |
| 8 | ∞ (stop) | 0.70 | | |
| 9 | 8.066 (aspherical surface) | 2.05 | 1.58736 | 60.70 |
| 10 | −25.833 (aspherical surface) | 0.19 | | |
| 11 | 24.177 | 0.70 | 1.90366 | 31.31 |
| 12 | 5.050 | 2.50 | 1.73159 | 49.03 |
| 13 | −966.947 | D13 | | |
| 14 | 13.069 | 1.20 | 1.69713 | 55.36 |
| 15 | 5.631 | D15 | | |
| 16 | −16.032 (aspherical surface) | 2.50 | 1.52542 | 55.78 |
| 17 | −5.686 (aspherical surface) | 1.40 | | |
| 18 | ∞ | 0.88 | 1.54771 | 62.84 |
| 19 | ∞ | 0.89 | | |
| 20 | ∞ | 0.50 | 1.51633 | 64.14 |
| 21 | ∞ | 0.60 | | |
| 22 | ∞ (image plane) | | | |

Aspherical coefficients

| Face No. | R | k | A4 | A6 | A8 | A10 | A12 |
|---|---|---|---|---|---|---|---|
| 2 | 11.387 | 0.000 | −2.36856e−05 | 1.56593e−05 | −1.19658e−06 | 4.93186e−08 | −7.68594e−10 |
| 9 | 8.066 | 0.000 | 5.78516e−05 | 1.27990e−05 | 9.56592e−08 | 7.99014e−08 | |
| 10 | −25.833 | 0.000 | 4.82107e−04 | 1.29892e−05 | 2.28462e−07 | 1.10251e−07 | |
| 16 | −16.032 | 0.000 | 2.64878e−04 | 1.56556e−04 | −8.32879e−06 | 1.28521e−07 | |
| 17 | −5.686 | 0.000 | 2.08343e−03 | 3.75514e−05 | 5.17129e−06 | −4.96626e−07 | 1.09322e−08 |

Zoom data

| | Wide-angle position | Middle position | Telephoto position |
|---|---|---|---|
| Focal length | 6.451 | 10.501 | 18.623 |
| FNO | 3.11 | 4.28 | 5.86 |
| Angle of view(2ω) | 63.6° | 37.2° | 20.9° |
| D7 | 13.38 | 8.14 | 1.60 |
| D13 | 5.00 | 3.91 | 5.50 |
| D15 | 2.00 | 8.33 | 13.28 |

Third Embodiment

Figure 7A:
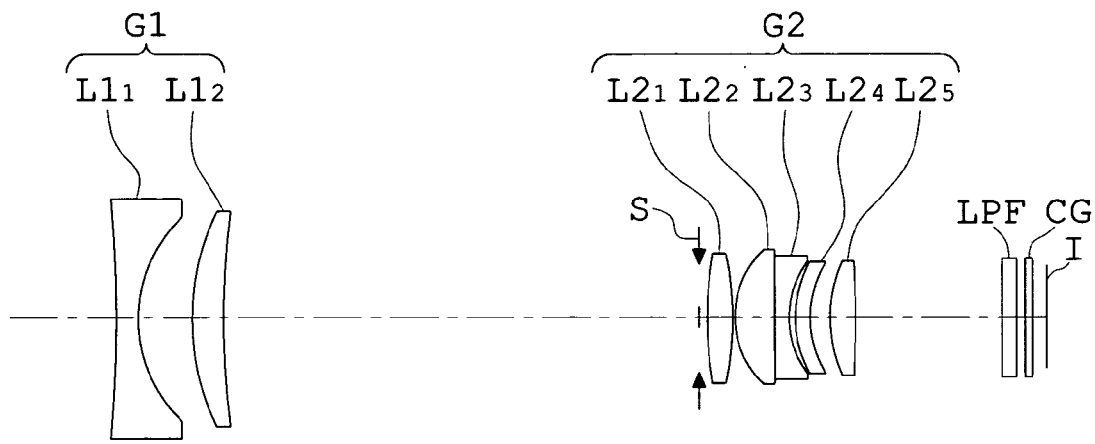
FIGS. 7A, 7B, and 7C are sectional views showing lens arrangements, developed along the optical axis, at wide-angle, middle, and telephoto positions, respectively, of the zoom optical system of a third embodiment in the present invention.
Figure 7B:
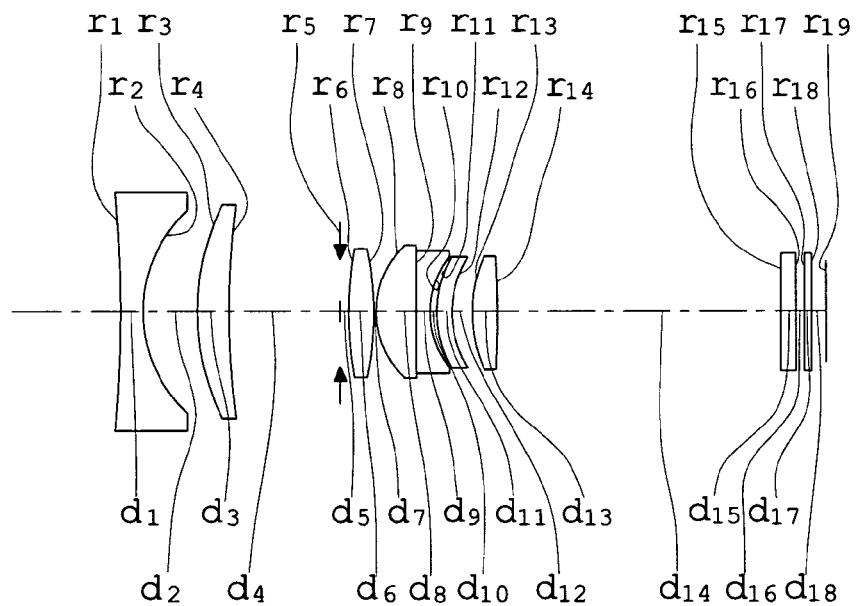
Figure 7C:
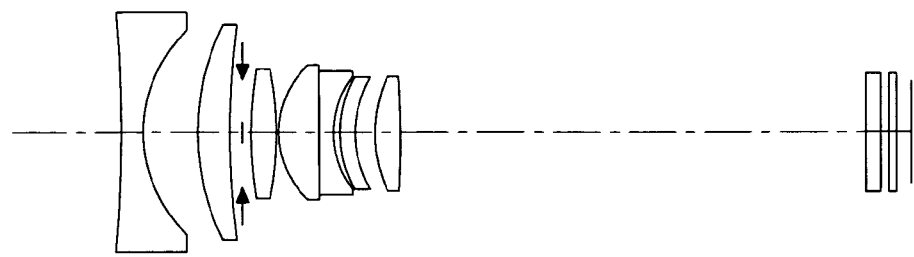

FIGS. 7A-7C show lens arrangements of the third embodiment of the zoom optical system according to the present invention. FIGS. 8A-8R show aberration characteristics of the zoom optical system in the third embodiment.

A two-lens-unit zoom optical system of the third embodiment comprises, in order from the object side, a first lens unit G1 with negative power, an aperture stop S, and a second lens unit G2 with positive power. Again, reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power and a second lens $L1_2$ with positive power. The first lens $L1_1$ with negative power is a biconcave lens whose image-side surface is aspherical. The second lens $L1_2$ with positive power is a meniscus lens with a convex surface facing the object side.

The second lens unit G2 with positive power includes, in order from the object side, a first lens $L2_1$ with positive power, both surfaces of which are aspherical, a cemented lens of a second lens $L2_2$ with positive power and a third lens $L2_3$ with negative power, a fourth lens $L2_4$ with negative power, and a fifth lens $L2_5$ with positive power, the image-side surface of which is aspherical. The first lens $L2_1$ with positive power is a biconvex lens and any of the second lens $L2_2$ with positive power, the third lens $L2_3$ with negative power, and the fourth lens $L2_4$ with negative power is a meniscus lens with a convex surface facing the object side. The fifth lens $L2_5$ with positive power is a biconvex lens.

The third embodiment adopts a zoom system that, upon zooming from the wide-angle position to the telephoto position, the first lens unit G1 is moved toward the image side and the second lens unit G2 is moved toward the object side to narrow the spacing between them, and the first lens unit G1 is moved again toward the object side to further narrow the spacing between them. That is, the first lens unit G1 is moved along a locus that is convex toward the image side and the second lens unit G2 is continuously moved toward the object side. The stop S is moved integrally with the second lens unit G2.

Subsequently, numerical data of optical members constituting the zoom optical system in the third embodiment are shown below.

| | f = 6.12~29.40 mm FNO = 2.9~6.1 2ω = 68.1°~14.0° | | | |
|---|---|---|---|---|
| Face No. | R | D | Nd | Vd |
| 1 | −83.970 | 1.42 | 1.77377 | 47.17 |
| 2 | 8.217 (aspherical surface) | 3.80 | | |
| 3 | 16.385 | 2.05 | 1.84666 | 23.78 |
| 4 | 40.048 | D4 | | |
| 5 | ∞ (stop) | 0.50 | | |
| 6 | 15.909 (aspherical surface) | 1.81 | 1.49700 | 81.54 |
| 7 | −37.889 (aspherical surface) | 0.10 | | |
| 8 | 6.545 | 2.75 | 1.57000 | 53.00 |
| 9 | 233.651 | 1.00 | 1.80962 | 34.50 |
| 10 | 6.478 | 0.44 | | |
| 11 | 8.406 | 1.00 | 1.84134 | 25.11 |
| 12 | 6.822 | 1.43 | | |
| 13 | 10.076 | 1.74 | 1.48700 | 70.40 |
| 14 | −82.513 (aspherical surface) | D14 | | |
| 15 | ∞ | 0.96 | 1.54771 | 62.84 |
| 16 | ∞ | 0.60 | | |
| 17 | ∞ | 0.50 | 1.51633 | 64.14 |
| 18 | ∞ | 1.00 | | |
| 19 | ∞ (image plane) | | | |

| Aspherical coefficients | | | | | | |
|---|---|---|---|---|---|---|
| Face No. | R | k | A4 | A6 | A8 | A10 |
| 2 | 8.217 | −0.768 | 7.25067e−07 | 1.29952e−06 | −4.28542e−08 | 3.95671e−10 |
| 6 | 15.909 | −13.771 | 2.17312e−04 | −1.47408e−05 | 6.45021e−08 | 9.60002e−10 |
| 7 | −37.889 | 0.000 | −1.70020e−04 | −7.31971e−06 | | |
| 14 | −82.513 | 463.833 | 3.80501e−04 | 2.74732e−05 | −2.08288e−06 | 1.25816e−07 |

| Zoom data | | | |
|---|---|---|---|
| | Wide-angle position | Middle position | Telephoto position |
| Focal length | 6.120 | 16.000 | 29.399 |
| FNO | 2.88 | 4.22 | 6.07 |
| Angle of view (2ω) | 68.1° | 25.6° | 14.0° |
| D4 | 32.73 | 7.99 | 1.00 |
| D14 | 10.17 | 19.48 | 32.11 |

Fourth Embodiment

Figure 9A:
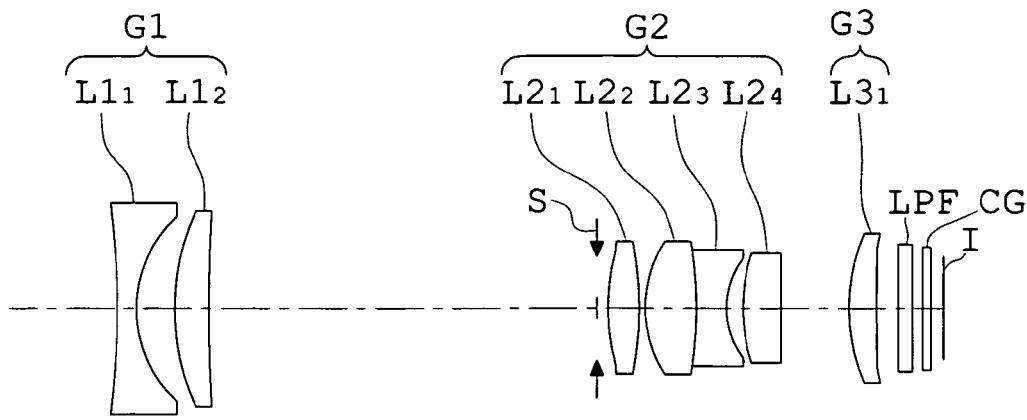
FIGS. 9A, 9B, and 9C are sectional views showing lens arrangements, developed along the optical axis, at wide-angle, middle, and telephoto positions, respectively, of the zoom optical system of a fourth embodiment in the present invention.
Figure 9B:
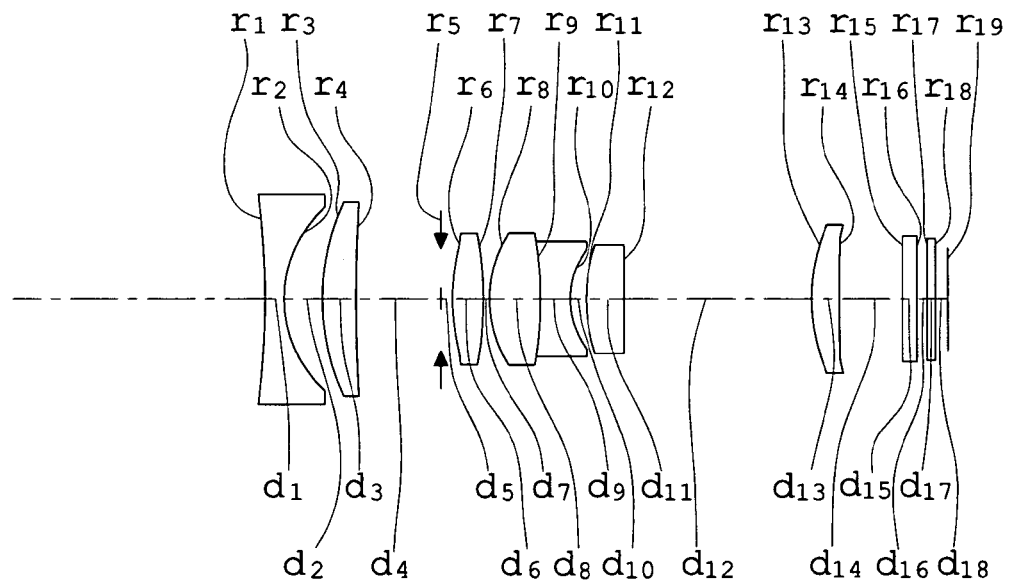
Figure 9C:
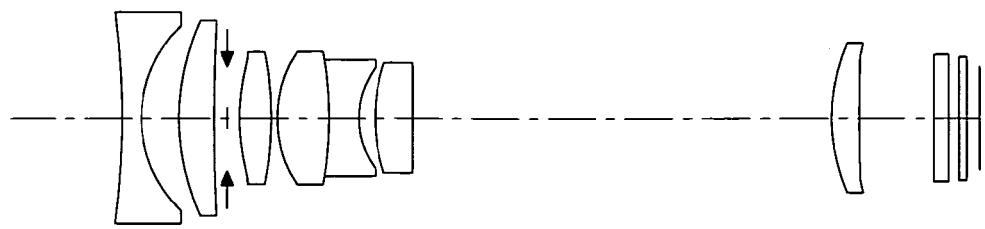

FIGS. 9A-9C show lens arrangements of the fourth embodiment of the zoom optical system according to the present invention. FIGS. 10A-10R show aberration characteristics of the zoom optical system in the fourth embodiment. A three-lens-unit zoom optical system of the fourth embodiment comprises, in order from the object side, a first lens unit G1 with negative power, an aperture stop S, a second lens unit G2 with positive power, and a third lens unit G3 with positive power. Again, reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power and a second lens $L1_2$ with positive power. The first lens $L1_1$ with negative power is a biconcave lens whose image-side surface is aspherical. The second lens $L1_2$ with positive power is a meniscus lens with a convex surface facing the object side.

The second lens unit G2 with positive power includes, in order from the object side, a first lens $L2_1$ with positive power, both surfaces of which are aspherical, a cemented lens of a second lens $L2_2$ with positive power and a third lens $L2_3$ with negative power, and a fourth lens $L2_4$ with positive power. Each of the first lens $L2_1$ with positive power and the second lens $L2_2$ with positive power is a biconvex lens, the third lens $L2_3$ with negative power is a biconcave lens, and the fourth lens $L2_4$ with positive power is s meniscus lens with a convex surface facing the object side.

The third lens unit G3 with positive power is constructed with a single meniscus lens $L3_1$ whose image-side surface is aspherical, with a convex surface facing the object side.

The fourth embodiment adopts a zoom system that, upon zooming from the wide-angle position to the telephoto position, the first lens unit G1 is moved toward the image side and the second lens unit G2 and the third lens unit G3 are moved toward the object side to narrow the spacing between the first lens unit G1 and the second lens unit G2 and at the same time, to widen the spacing between the second lens unit G2 and the third lens unit G3; and the first lens unit G1 is moved again toward the object side to further narrow the spacing between the first lens unit G1 and the second lens unit G2 and at the same time, to further widen the spacing between the second lens unit G2 and the third lens unit G3. That is, the first lens unit G1 is moved along a locus that is convex toward the image side and the second lens unit G2 is continuously moved toward the object side. The stop S is moved integrally with the second lens unit G2.

Subsequently, numerical data of optical members constituting the zoom optical system in the fourth embodiment are shown below.

| \multicolumn{5}{c}{f = 6.12~29.40 mm FNO = 2.6~6.1 2ω = 66.3°~14.4°} | | | | |
|---|---|---|---|---|
| Face No. | R | D | Nd | Vd |
| 1 | −62.387 | 1.30 | 1.80610 | 40.73 |
| 2 | 7.292 (aspherical surface) | 2.52 | | |
| 3 | 15.317 | 2.36 | 1.84666 | 23.78 |
| 4 | 116.876 | D4 | | |
| 5 | ∞ (stop) | 0.80 | | |
| 6 | 13.243 (aspherical surface) | 2.11 | 1.58913 | 61.25 |
| 7 | −32.184 (aspherical surface) | 0.30 | | |
| 8 | 8.086 | 3.50 | 1.67790 | 55.34 |
| 9 | −27.972 | 1.98 | 1.90366 | 31.31 |
| 10 | 5.317 | 1.20 | | |
| 11 | 14.432 | 2.59 | 1.72000 | 46.02 |
| 12 | 156.168 | D12 | | |
| 13 | 11.588 (aspherical surface) | 1.99 | 1.49700 | 81.61 |
| 14 | 40.354 (aspherical surface) | D14 | | |
| 15 | ∞ | 0.95 | 1.54771 | 62.84 |
| 16 | ∞ | 0.60 | | |
| 17 | ∞ | 0.50 | | |
| 18 | ∞ | 1.00 | 1.51633 | 64.14 |
| 19 | ∞ (image plane) | | | |

Aspherical coefficients

| Face No. | R | k | A4 | A6 | A8 | A10 |
|---|---|---|---|---|---|---|
| 2 | 7.292 | −0.210 | −2.50306e−04 | −3.66180e−07 | −7.08895e−08 | 2.06659e−10 |
| 6 | 13.243 | −14.956 | 5.92083e−04 | −3.62746e−05 | 1.34535e−06 | −5.20347e−08 |
| 7 | −32.184 | −0.102 | −1.98559e−04 | −8.66572e−06 | 3.29960e−07 | −2.97872e−08 |
| 13 | 11.588 | 0.000 | −7.53605e−04 | 4.70479e−05 | −1.05712e−06 | 1.94335e−08 |
| 14 | 40.354 | 0.000 | −1.14451e−03 | 7.40857e−05 | −2.01432e−06 | 3.76683e−08 |

Zoom data

| | Wide-angle position | Middle position | Telephoto position |
|---|---|---|---|
| Focal length | 6.120 | 16.017 | 29.400 |
| FNO | 2.60 | 4.00 | 6.10 |
| Angle of view (2ω) | 66.4° | 26.0° | 14.4° |
| D4 | 26.31 | 5.97 | 1.00 |
| D12 | 4.47 | 12.46 | 28.28 |
| D14 | 1.55 | 4.34 | 5.04 |

Fifth Embodiment

Figure 11A:
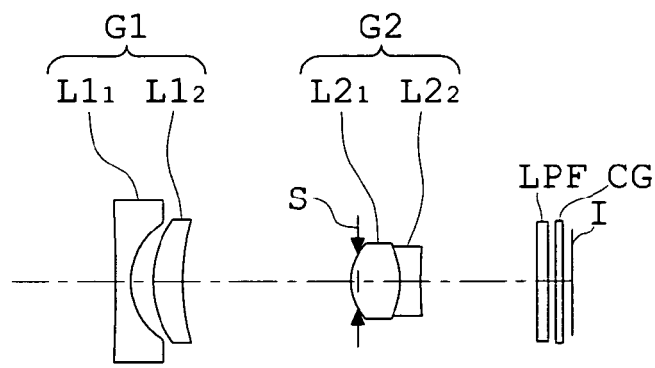
FIGS. 11A, 11B, and 11C are sectional views showing lens arrangements, developed along the optical axis, at wide-angle, middle, and telephoto positions, respectively, of the zoom optical system of a fifth embodiment in the present invention.
Figure 11B:
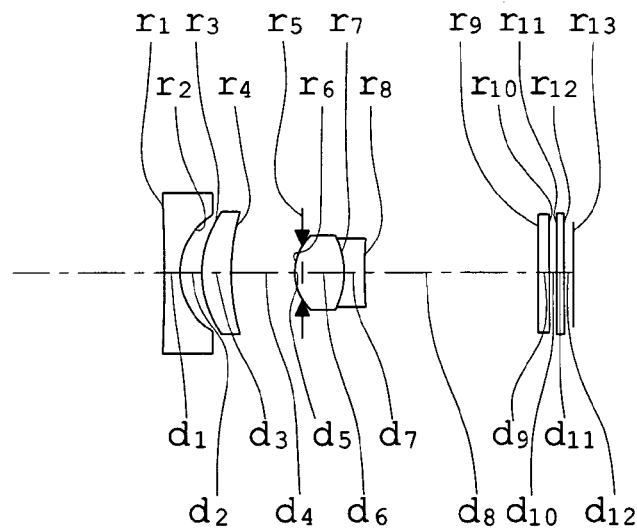
Figure 11C:
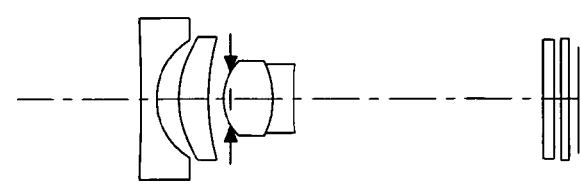

FIGS. 11A-11C show lens arrangements of the fifth embodiment of the zoom optical system according to the present invention. FIGS. 12A-12R show aberration characteristics of the zoom optical system in the fifth embodiment.

A two-lens-unit zoom optical system of the fifth embodiment comprises, in order from the object side, a first lens unit G1 with negative power, an aperture stop S, and a second lens unit G2 with positive power. Again, reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power and a second lens $L1_2$ with positive power. The first lens $L1_1$ with negative power is a biconcave lens whose image-side surface is aspherical. The second lens $L1_2$ with positive power is a meniscus lens with a convex surface facing the object side.

The second lens unit G2 with positive power is constructed with a cemented lens including, in order from the object side, a first lens $L2_1$ with positive power, the object-side surface of which is aspherical, and a second lens $L2_2$ with negative power, the image-side surface of which is aspherical. The first lens $L2_1$ with positive power is a biconvex positive lens and the second lens $L2_2$ with negative power is a meniscus lens with a convex surface facing the image side in the proximity of the optical axis.

The fifth embodiment adopts a zoom system that, upon zooming from the wide-angle position to the telephoto position, the first lens unit G1 is moved toward the image side and the second lens unit G2 is moved toward the object side to narrow the spacing between them, and the first lens unit G1 is moved again toward the object side to further narrow the spacing between them. That is, the first lens unit G1 is moved along a locus that is convex toward the image side and the second lens unit G2 is continuously moved toward the object side. The stop S is provided on the object-side surface of the first lens L2, of the second lens unit G2.

Subsequently, numerical data of optical members constituting the zoom optical system in the fifth embodiment are shown below.

| | f = 5.54~15.97 mm FNO = 3.3~5.7 2ω = 77.2°~26.9° | | | |
|---|---|---|---|---|
| Face No. | R | D | Nd | Vd |
| 1 | −100.000 | 1.05 | 1.74320 | 49.34 |
| 2 | 4.130 (aspherical surface) | 1.51 | | |
| 3 | 7.546 | 2.00 | 2.00330 | 28.27 |
| 4 | 16.070 | D4 | | |
| 5 | ∞ (stop) | −0.50 | | |
| 6 | 3.859 (aspherical surface) | 3.35 | 1.49700 | 81.61 |
| 7 | −6.663 | 1.36 | 1.68893 | 31.08 |
| 8 | −54.645 (aspherical surface) | D8 | | |
| 9 | ∞ | 0.76 | 1.54771 | 62.84 |
| 10 | ∞ | 0.50 | | |
| 11 | ∞ | 0.50 | 1.51633 | 64.14 |
| 12 | ∞ | 0.61 | | |
| 13 | ∞ (image plane) | | | |

| Aspherical coefficients | | | | | | |
|---|---|---|---|---|---|---|
| Face No. | R | k | A4 | A6 | A8 | A10 |
| 2 | 4.130 | −1.000 | 7.45220e−04 | 3.71680e−07 | 1.23023e−08 | |
| 6 | 3.859 | −0.000 | −1.32045e−04 | −4.27932e−06 | 7.11990e−06 | −7.29742e−07 |
| 8 | −54.645 | 0.000 | 3.11821e−03 | 3.10545e−04 | −2.42093e−05 | 8.19075e−06 |

| Zoom data | | | |
|---|---|---|---|
| | Wide-angle position | Middle position | Telephoto position |
| Focal length | 5.539 | 10.174 | 15.970 |
| FNO | 3.31 | 4.36 | 5.68 |
| Angle of view (2ω) | 77.2° | 42.0° | 26.9° |
| D4 | 11.86 | 4.66 | 1.53 |
| D8 | 8.13 | 12.06 | 16.96 |

Sixth Embodiment

Figure 13A:
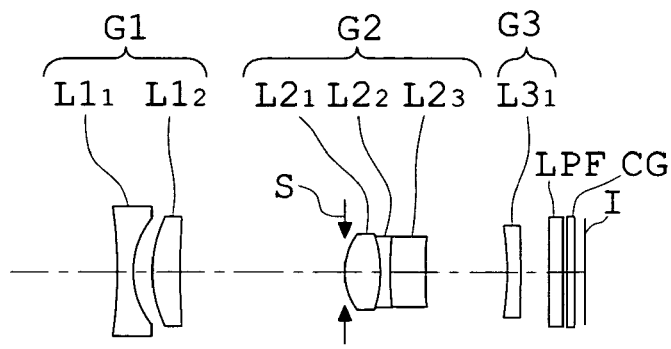
FIGS. 13A, 13B, and 13C are sectional views showing lens arrangements, developed along the optical axis, at wide-angle, middle, and telephoto positions, respectively, of the zoom optical system of a sixth embodiment in the present invention.
Figure 13B:
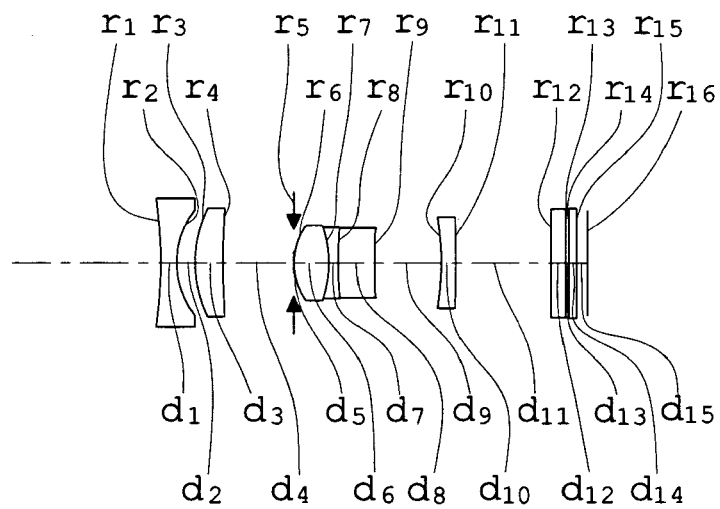
Figure 13C:
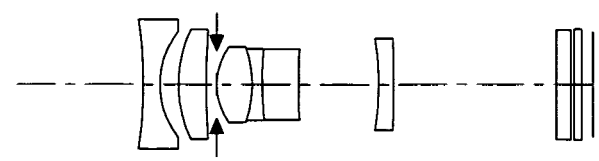

FIGS. 13A-13C show lens arrangements of the sixth embodiment of the zoom optical system according to the present invention. FIGS. 14A-14R show aberration characteristics of the zoom optical system in the sixth embodiment.

A three-lens-unit zoom optical system of the sixth embodiment comprises, in order from the object side, a first lens unit G1 with negative power, an aperture stop S, a second lens unit G2 with positive power, and a third lens unit G3 with negative power. Again, reference symbol LPF denotes an optical low-pass filter, CG denotes a cover glass, and I denotes the imaging surface of an electronic image sensor such as a CCD.

The first lens unit G1 with negative power includes, in order from the object side, a first lens $L1_1$ with negative power and a second lens $L1_2$ with positive power. The first lens $L1_1$ with negative power is a biconcave lens whose image-side surface is aspherical. The second lens $L1_2$ with positive power is a meniscus lens with a convex surface facing the object side.

The second lens unit G2 with positive power is constructed with a cemented lens including, in order from the object side, a first lens $L2_1$ with positive power, the object-side surface of which is aspherical, a second lens $L2_2$ with negative power, and a third lens $L2_3$ with positive power, the image-side surface of which is aspherical. The first lens $L2_1$ with positive power is a biconvex lens, the second lens $L2_2$ with negative power is a biconcave lens, and the third lens $L2_3$ with positive power is a positive lens having a biconvex shape in the proximity of the optical axis.

The third lens unit G3 with negative power is constructed with a single negative meniscus lens $L3_1$ whose object-side surface is aspherical.

The sixth embodiment adopts a zoom system that, upon zooming from the wide-angle position to the telephoto position, the first lens unit G1 is moved toward the image side and the second lens unit G2 and the third lens unit G3 are moved toward the object side to narrow the spacing between the first lens unit G1 and the second lens unit G2 and at the same time, to narrow the spacing between the second lens unit 62 and the third lens unit G3, and the first lens unit G1 is moved again toward the object side. That is, the first lens unit G1 is moved along a locus that is convex toward the image side and the second lens unit G2 is continuously moved toward the object side. The stop S is moved integrally with the second lens unit G2.

Subsequently, numerical data of optical members constituting the zoom optical system in the sixth embodiment are shown below.

| | f = 6.42~18.47 mm FNO = 3.3~5.9 2ω = 63.8°~22.1° | | | |
|---|---|---|---|---|
| Face No. | R | D | Nd | Vd |
| 1 | −32.124 | 1.00 | 1.80610 | 40.92 |
| 2 | 5.093 (aspherical surface) | 1.28 | | |
| 3 | 9.074 | 1.90 | 1.80518 | 25.42 |
| 4 | 101.120 | D4 | | |
| 5 | ∞ (stop) | 0.00 | | |
| 6 | 4.169 (aspherical surface) | 2.30 | 1.58913 | 61.14 |
| 7 | −8.891 | 0.70 | 1.90366 | 31.31 |
| 8 | 25.399 | 2.40 | 1.49700 | 81.54 |
| 9 | −20.234 (aspherical surface) | D9 | | |
| 10 | −20.714 (aspherical surface) | 1.00 | 1.69350 | 53.21 |
| 11 | −128.281 | D11 | | |
| 12 | ∞ | 0.86 | 1.53996 | 59.45 |
| 13 | ∞ | 0.27 | | |
| 14 | ∞ | 0.50 | 1.51633 | 64.14 |
| 15 | ∞ | 0.70 | | |
| 16 | ∞ (image plane) | | | |

Aspherical coefficients

| Face No. | R | k | A4 | A6 | A8 | A10 |
|---|---|---|---|---|---|---|
| 2 | 5.093 | 0.000 | −6.99633e−04 | −3.82888e−05 | 1.68446e−06 | −9.90448e−08 |
| 6 | 4.169 | 0.000 | −1.89108e−04 | 2.57822e−05 | −2.60395e−07 | |
| 9 | −20.234 | 0.000 | 3.74729e−03 | 3.95148e−04 | −5.71334e−05 | 1.32310e−05 |
| 10 | −20.714 | −8.695 | −2.34605e−04 | 7.28848e−05 | −1.83932e−05 | 1.74716e−06 |

Zoom data

| | Wide-angle position | Middle position | Telephoto position |
|---|---|---|---|
| Focal length | 6.421 | 10.972 | 18.471 |
| FNO | 3.30 | 4.33 | 5.85 |
| Angle of view (2ω) | 63.8° | 37.0° | 22.1° |
| D4 | 10.80 | 4.59 | 0.55 |
| D9 | 5.40 | 4.41 | 5.32 |
| D11 | 1.98 | 6.55 | 10.92 |

Subsequently, values of conditions in individual embodiments are listed in Table 1.

TABLE 1

|  | First embodiment | Second embodiment | third embodiment | Fourth embodiment | Fifth embodiment | Sixth embodiment |
| --- | --- | --- | --- | --- | --- | --- |
| $f_w$ | 6.45 | 6.45 | 6.12 | 6.12 | 5.54 | 6.42 |
| $f_t$ | 18.61 | 18.62 | 29.40 | 29.40 | 15.97 | 18.47 |
| $y_{07}$ | 2.52 | 2.52 | 2.52 | 2.52 | 2.66 | 2.52 |
| $y_{10}$ | 3.60 | 3.60 | 3.60 | 3.60 | 3.80 | 3.60 |
| $\tan \omega_{07w}$ | −0.41 | −0.41 | −0.44 | −0.43 | −0.52 | −0.41 |
| $\tan \omega_{10w}$ | −0.62 | −0.62 | −0.68 | −0.65 | −0.80 | −0.62 |
| $\beta_{2w}$ | −0.55 | −0.41 | −0.38 | −0.46 | −0.54 | −0.49 |
| $\beta_{2t}$ | −1.38 | −0.80 | −1.82 | −2.56 | −1.57 | −1.14 |
| $\beta_{3w}$ | 1.43 | 1.49 | 1.00 | 0.82 |  | 1.13 |
| $\beta_{3t}$ | 1.65 | 2.23 | 1.00 | 0.71 |  | 1.38 |
| $R_1$ | −67.10 | −34.97 | −83.97 | −62.39 | 100.00 | −32.12 |
| $R_2$ | 9.88 | 11.39 | 8.22 | 7.29 | 4.13 | 5.09 |
| $R_3$ | 12.01 | 11.38 | 16.39 | 15.32 | 7.55 | 9.07 |
| $R_4$ | 12.24 | 11.65 | 40.05 | 116.88 | 16.07 | 101.12 |
| $n_{dA}$ | 1.81 | 1.77 | 1.77 | 1.81 | 1.74 | 1.81 |
| $f_1$ | −12.22 | −12.92 | −16.13 | −16.28 | −10.17 | −11.74 |
| $f_2$ | 10.65 | 10.16 | 15.20 | 14.24 | 8.61 | 8.65 |
| $f_t/f_w$ | 2.88 | 2.89 | 4.80 | 4.80 | 2.88 | 2.88 |
| $f_1/f_w$ | −1.89 | −2.00 | −2.64 | −2.66 | −1.84 | −1.83 |
| $|y_{07}/(f_w \cdot \tan \omega_{07w})|$ | 0.95 | 0.96 | 0.94 | 0.95 | 0.93 | 0.95 |
| $|y_{10}/(f_w \cdot \tan \omega_{10w})|$ | 0.90 | 0.90 | 0.87 | 0.90 | 0.86 | 0.90 |
| $(R_1 + R_2)/(R_1 - R_2)$ | 0.74 | 0.51 | 0.82 | 0.79 | 0.92 | 0.73 |
| $(R_3 - R_4)/(R_3 + R_4)$ | −0.01 | −0.01 | −0.42 | −0.77 | 0.36 | −0.84 |
| $|y_{07}/(f_w \cdot \tan \omega_{07w}) - y_{10}/(f_w \cdot \tan \omega_{10w})|$ | 0.05 | 0.06 | 0.07 | 0.05 | 0.07 | 0.05 |

In Table 1, $f_t$ is the focal length of the entire zoom optical system at the telephoto position, $\beta_{2w}$ is the magnification of the second lens unit at the wide-angle position, $\beta_{2t}$ is the magnification of the second lens unit at the telephoto position, $\beta_{3w}$ is the magnification of the third lens unit at the wide-angle position, $\beta_{3t}$ is the magnification of the third lens unit at the telephoto position, $f_2$ is the focal length of the second lens unit, and $f_y/fw$ is a zoom ratio.

The electronic imaging apparatus using the optical path-bending zoom optical system of the present invention such as that mentioned above can be used in the photographing apparatus in which the image of the object is formed by the imaging optical system, such as a zoom optical system, and is received by the image sensor, such as a CCD, to photograph, notably in a digital camera or a video camera, a personal computer which is an example of an information processing apparatus, or a telephone, especially a mobile phone that is handy to carry. The embodiments of such apparatuses are shown below.

Figure 15:
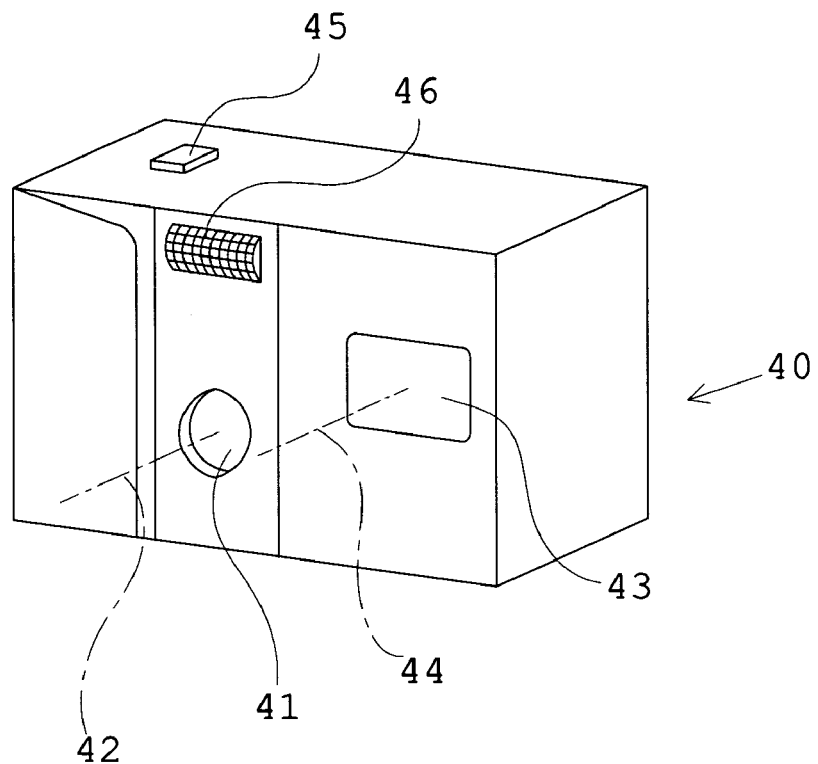
FIG. 15 is a perspective front view showing the appearance of an example of a digital camera incorporating the zoom optical system according to the present invention.
Figure 16:
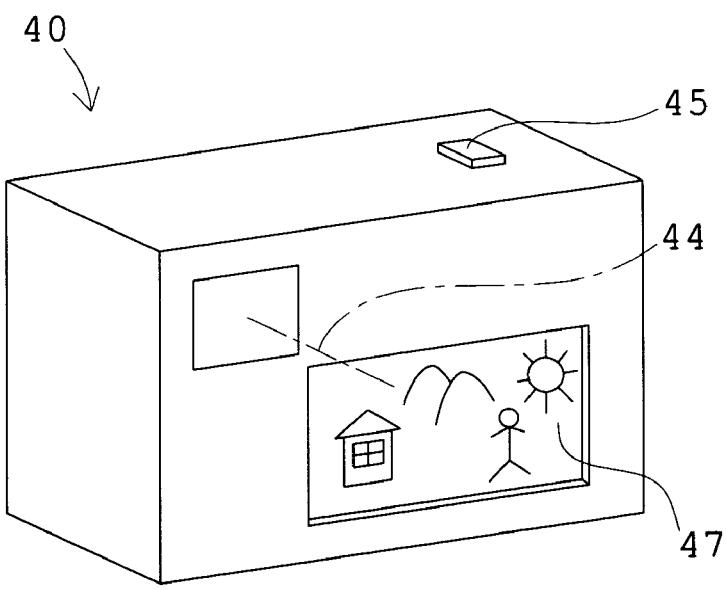
FIG. 16 is a perspective rear view showing the digital camera of FIG. 15.
Figure 17:
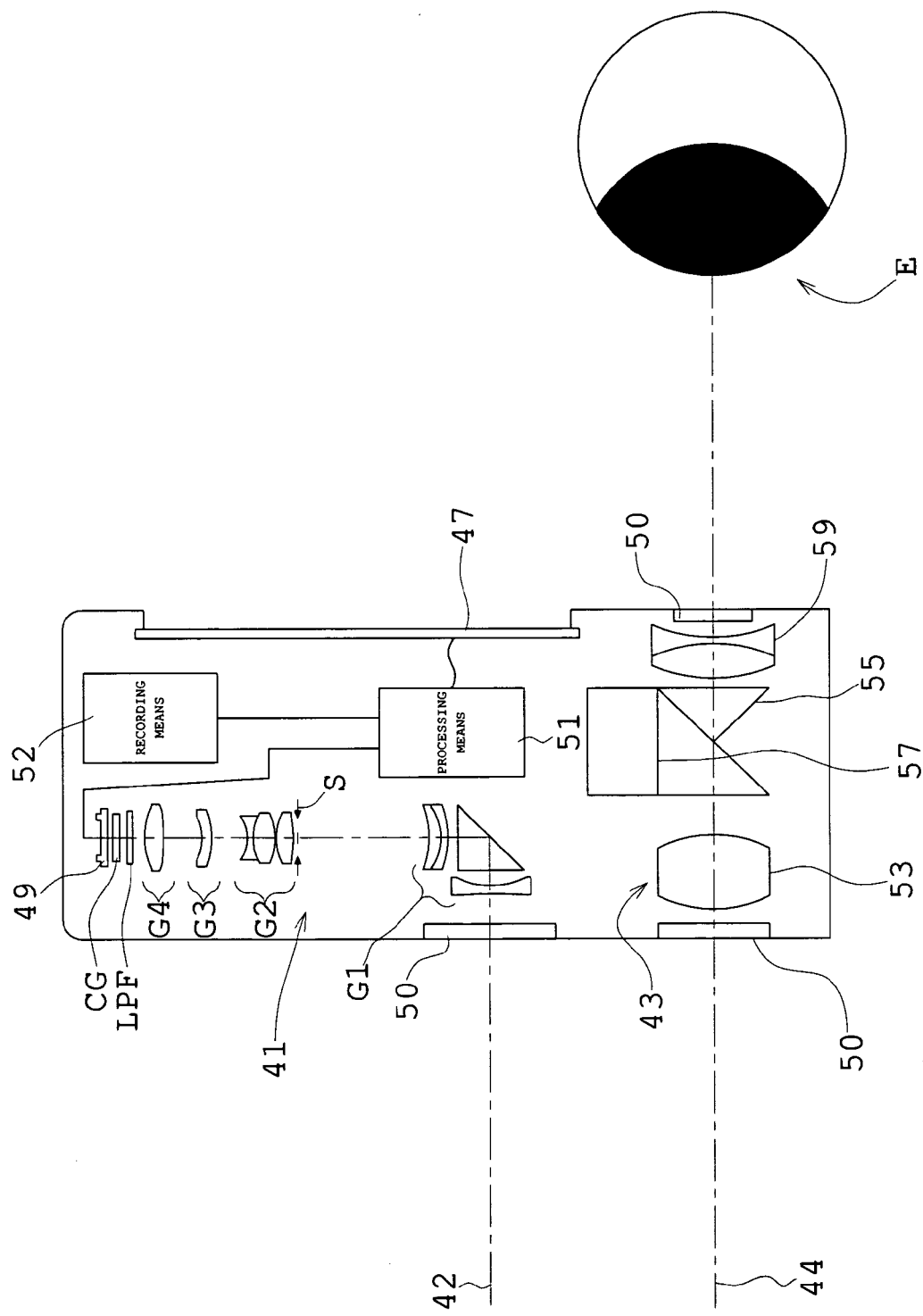
FIG. 17 is a sectional view showing the structure of the digital camera of FIG. 15.

FIGS. 15-17 show a digital camera 40 in which the optical path-bending zoom optical system according to the present invention is assembled in a photographing optical system 41. Also, the digital camera shown in FIG. 17 is constructed so that an imaging optical path is bent along the major side of a finder, and an observer's eye is viewed from the upper side.

The digital camera 40, in this example, includes the photographing optical system 41 having a photographing optical path 42, a finder optical system 43 having a finder optical path 44, a shutter button 45, a flash lamp 46, and a liquid crystal display monitor 47. When the shutter button 45 provided on the upper face of the camera 40 is pushed, photographing is performed, in association with this shutter operation, through the photographing optical system 41, for example, the path-bending zoom optical system of the first embodiment.

An object image produced by the photographing optical system 41 is formed on the imaging surface of a CCD 49 through a near-infrared cutoff filter or a near-infrared cutoff coat applied to the CCD cover glass or any other lens.

The object image received by the CCD 49 is displayed as an electronic image on the liquid crystal display monitor 47 provided on the back face of the camera, through a processing means 51. A recording means 52 is connected to this processing means 51 so that a photographed electronic image can also be recorded. Also, the recording means 52 may be provided to be independent of the processing means 51, or may be constructed so that the image is electronically recorded and written by a flexible disk, memory card, or MO.

Further, a finder objective optical system 53 is located on the finder optical path 44. The object image produced by the finder objective optical system 53 is formed on a field frame 57 of a Porro prism 55 that is an image erecting member. Behind the Porro prism 55 is located an eyepiece optical system 59 which introduces an erect image into an observer's eye E. Also, cover members 50 are provided on the entrance side of each of the photographing optical system 41 and the finder objective optical system 53, and on the exit side of the eyepiece optical system 59.

The digital camera 40 constructed as mentioned above brings about an effect on the slim design of the camera by bending the optical path along the major side. Moreover, the photographing optical system 41 is a zoom optical system that has a wide angle of view and a high variable magnification ratio, is favorably corrected for aberration, is bright, and has a long back focal length along which filters can be placed. Thus, high performance and low cost can be attained.

Also, the digital camera 40 of this embodiment may be constructed so that the imaging optical path is bent along the minor side of the finder. In this case, the position of a stroboscopic lamp (or the flash lamp) is further shifted upward from the entrance surface of a photographic lens so that the influence of a shadow produced in stroboscopic photography of people can be lessened.

Also, although in FIG. 17 a plane-parallel plate is provided as each of the cover members 50, a lens with power may be used.

Figure 18:
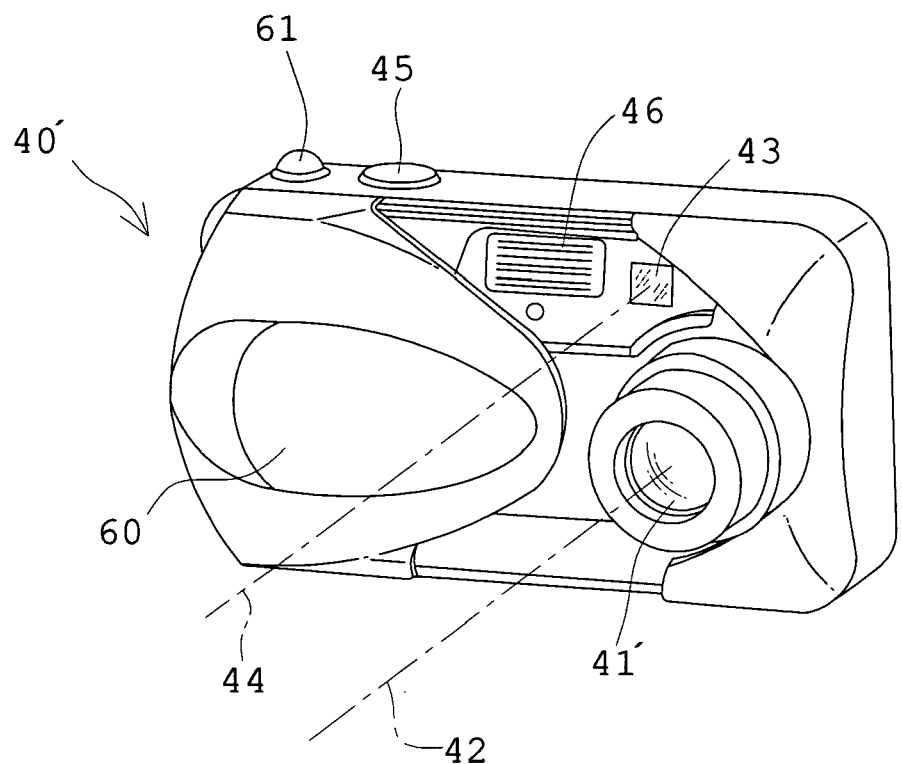
FIG. 18 is a perspective front view showing the appearance of an example of a collapsible digital camera incorporating the zoom optical system according to the present invention.
Figure 19:
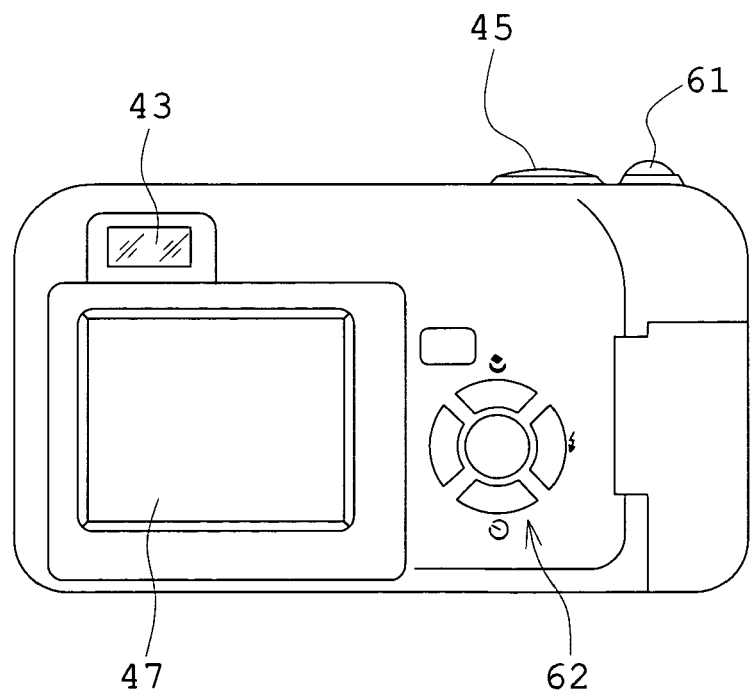
FIG. 19 is a perspective rear view showing the digital camera of FIG. 18.
Figure 20:
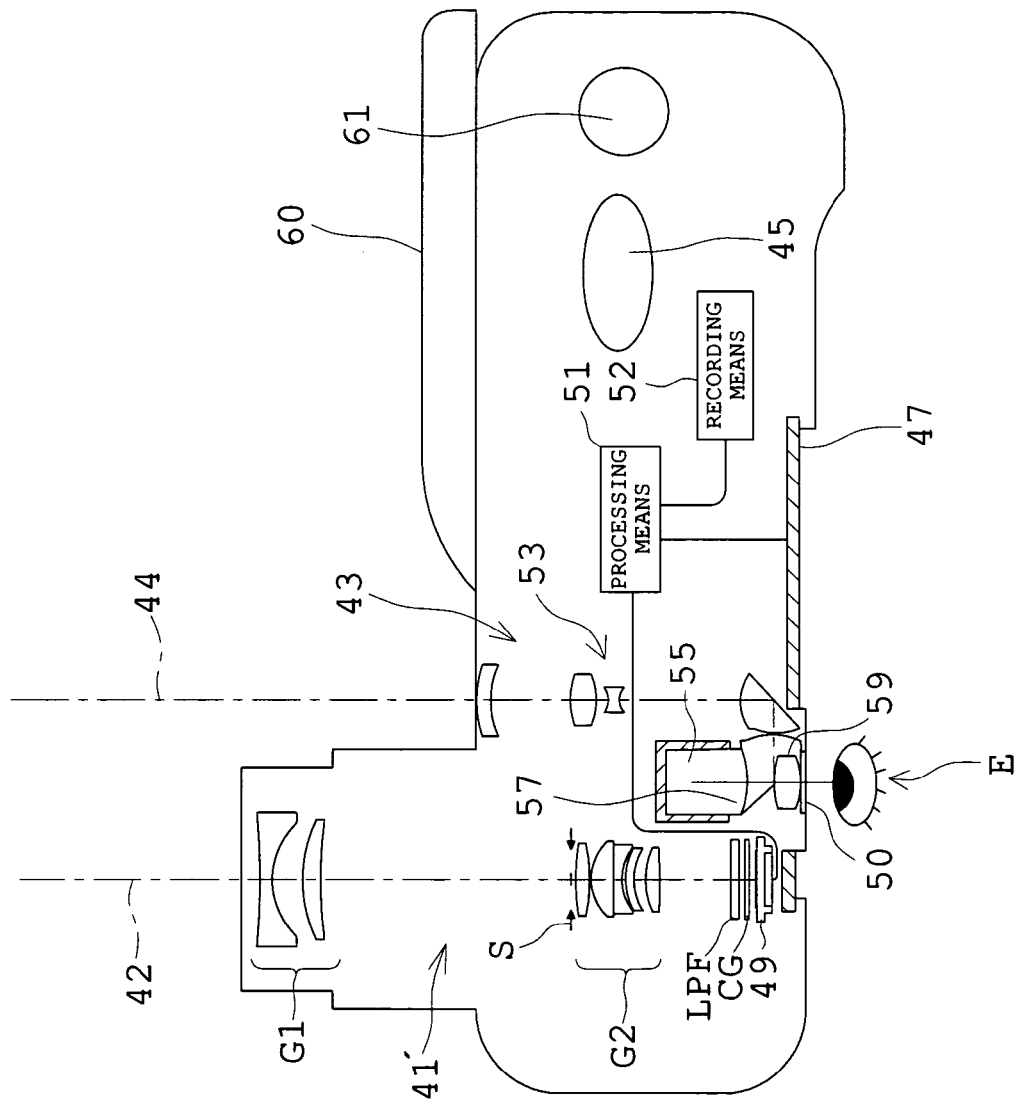
FIG. 20 is an opened-up view showing schematically the structure of the digital camera of FIG. 18.

FIGS. 18-20 show a collapsible digital camera 40' incorporating the zoom optical system of the present invention in a photographing optical system 41'. In FIGS. 18 and 20, a state where the photographing optical system 41' is not collapsed is shown. Also, like reference numerals are used for like members with respect to the digital camera 40 incorporating the path-bending zoom optical system.

The digital camera 40', in this example, includes the photographing optical system 41' having the photographing optical path 42, the finder optical system 43 having the finder optical path 44, the shutter button 45, the flash lamp 46, the liquid crystal display monitor 47, a focal-length changing button 61, and a setting changing switch 62. When the photographing optical system 41' is collapsed, a cover 60 is slid and thereby the photographing optical system 41', the finder optical system 43, and the flash lamp 46 are covered by the cover 60. When the cover 60 is opened and the camera 40' is set to a photographic mode, the photographing optical system 41' becomes a non-collapsible state of FIG. 20. When the shutter button 45 provided on the upper face of the camera 40' is pushed, photographing is performed, in association with this shutter operation, through the photographing optical system 41', for example, the zoom lens of the third embodiment.

An object image produced by the photographing optical system 41' is formed on the imaging surface of the CCD 49 through the low-pass filter LPF applying an IR cutoff coat and the cover glass CG. The object image received by the CCD 49 is displayed as an electronic image on the liquid crystal display monitor 47 provided on the back face of the camera, through the processing means 51. The recording means 52 is connected to this processing means 51 so that a photographed electronic image can also be recorded. Also, the recording means 52 may be provided to be independent of the processing means 51, or may be constructed so that the image is electronically recorded and written by a floppy disk, memory card, or MO.

Further, the finder objective optical system 53 is located on the finder optical path 44. The finder objective optical system 53 includes a plurality of lens units (three lens units in the case of the figure) and two prisms and is a zoom optical system that the focal length is changed in association with the operation of the zoom lens of the photographing optical system 41'. The object image produced by the finder objective optical system 53 is formed on the field frame 57 of the erecting prism 55 that is an image erecting member. Behind the erecting prism 55 is located the eyepiece optical system 59 which introduces the erect image into the observer's eye E. Also, the cover member 50 is provided on the exit side of the eyepiece optical system 59.

In the digital camera 40' constructed as mentioned above, the photographing optical system 41' has high performance, is small in size, and is collapsible. Thus, high performance and low cost can be attained.

Figure 21:
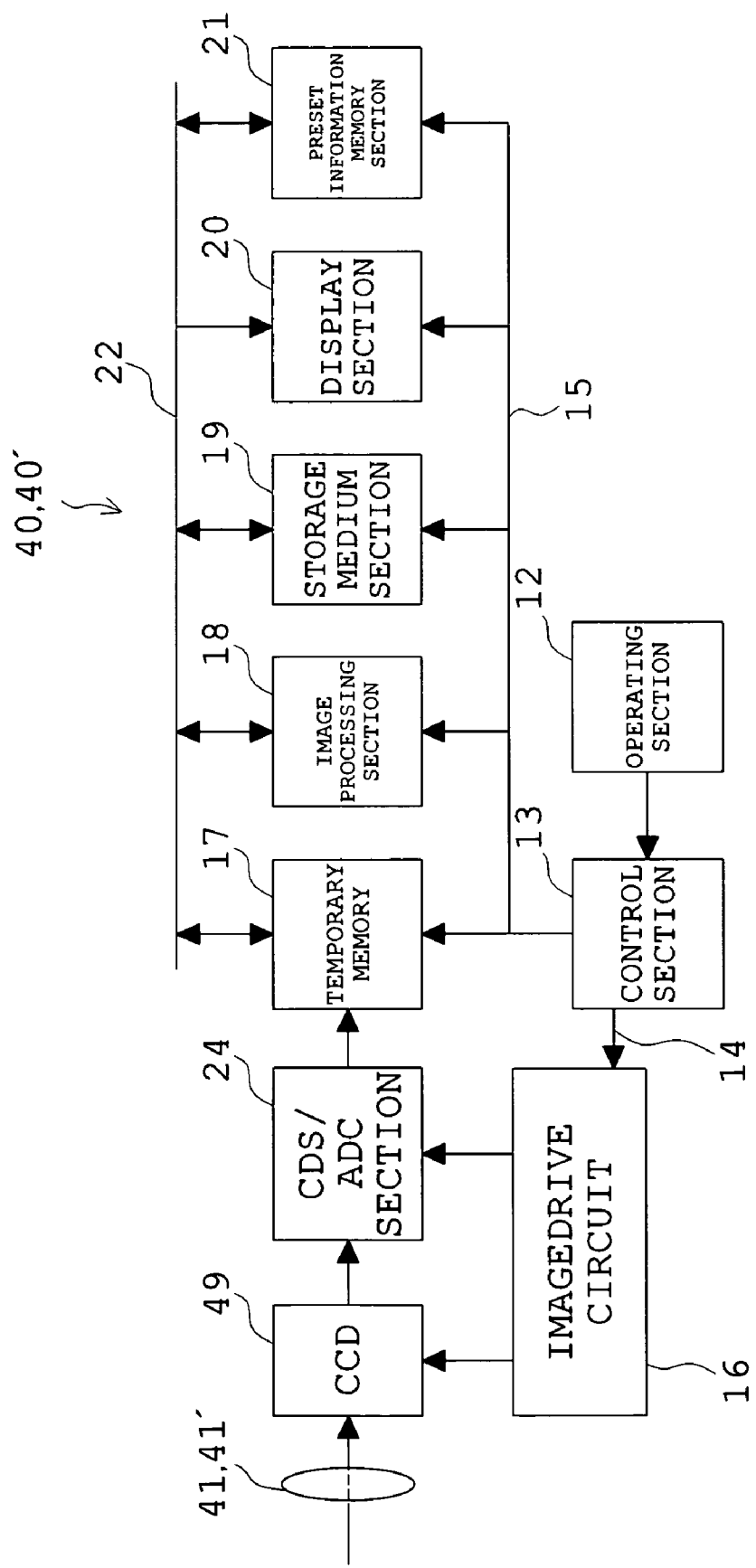
FIG. 21 is a block diagram showing the configuration of an internal circuit of essential parts of each of the digital cameras of FIGS. 15 and 18.

FIG. 21 shows the configuration of the internal circuit of essential sections of the digital camera 40 or 40'. In the following description, the processing means 51 includes, for example, a CDS/ADC section 24, a temporary memory 17, and an image processing section 18, and the recording means 52 includes, for example, a storage medium section 19.

The digital camera 40 or 40', as shown in FIG. 21, has an operating section 12; a control section 13 connected to the operating section 12; and an image drive circuit 16, the temporary memory 17, the image processing section 18, the storage medium section 19, a display section 20, and a preset information memory section 21, connected to control signal output ports of the control section 13 through busses 14 and 15.

The temporary memory 17, the image processing section 18, the storage medium section 19, the display section 20, and the preset information memory section 21 are constructed so that data are mutually input or output through a bus 22. A CCD 49 and the CDS/ADC section 24 are connected to the image drive circuit 16.

The operating section 12 is a circuit provided with various input buttons and switches and transmitting event information input from the exterior (a camera user) through these input buttons and switches to the control section 13. The control section 13 is a circuit that is a central arithmetical processing unit including, for example, a CPU, and incorporates a program memory, not shown, to control the whole of the digital camera 40 or 40' by receiving instructions input from the camera user through the operating section 12 in accordance with a program housed in the program memory.

The CCD 49 receives the object image formed through the photographing optical system 41 or 41' according to the present invention. The CCD 49 is an image sensor that is drive-controlled by the image drive circuit 16 and converts the amount of light of each pixel of the object image into an electric signal to output the signal to the CDS/ADC section 24.

The CDS/ADC section 24 is a circuit that amplifies the electric signal input from the CCD 49 and carries out an analog/digital conversion to output image raw data (Bayer data, hereinafter called RAW data) according to only such amplification and digital conversion to the temporary memory 17.

The temporary memory 17 is a memory device that is a buffer including, for example, SDRAM and temporarily stores the RAW data output from the CDS/ADC section 24. The image processing section 18 is a circuit that reads out the RAW data stored in the temporary memory 17 or the storage medium section 19 to electrically process various images, together with correction for coma, in accordance with image-quality parameters designated by the control section 13.

The storage medium section 19 is a control circuit of a device that removably mounts a card or stick recording medium including, for example, a flash memory and records and holds the RAW data transferred from the temporary memory 17 and image data processed by the image processing section 18 in the card or stick flash memory.

The display section 20 is a circuit that is provided with the liquid crystal display monitor 47 to display an image and an operation menu on the liquid crystal display monitor 47. The preset information memory section 21 is provided with a ROM previously incorporating various image-quality parameters and a RAM storing an image-quality parameter selected by the input operation of the operating section 12 from among image-quality parameters read out from the ROM. The preset information memory section 21 is a circuit for controlling the input into and output from to these memories.

Figure 22:
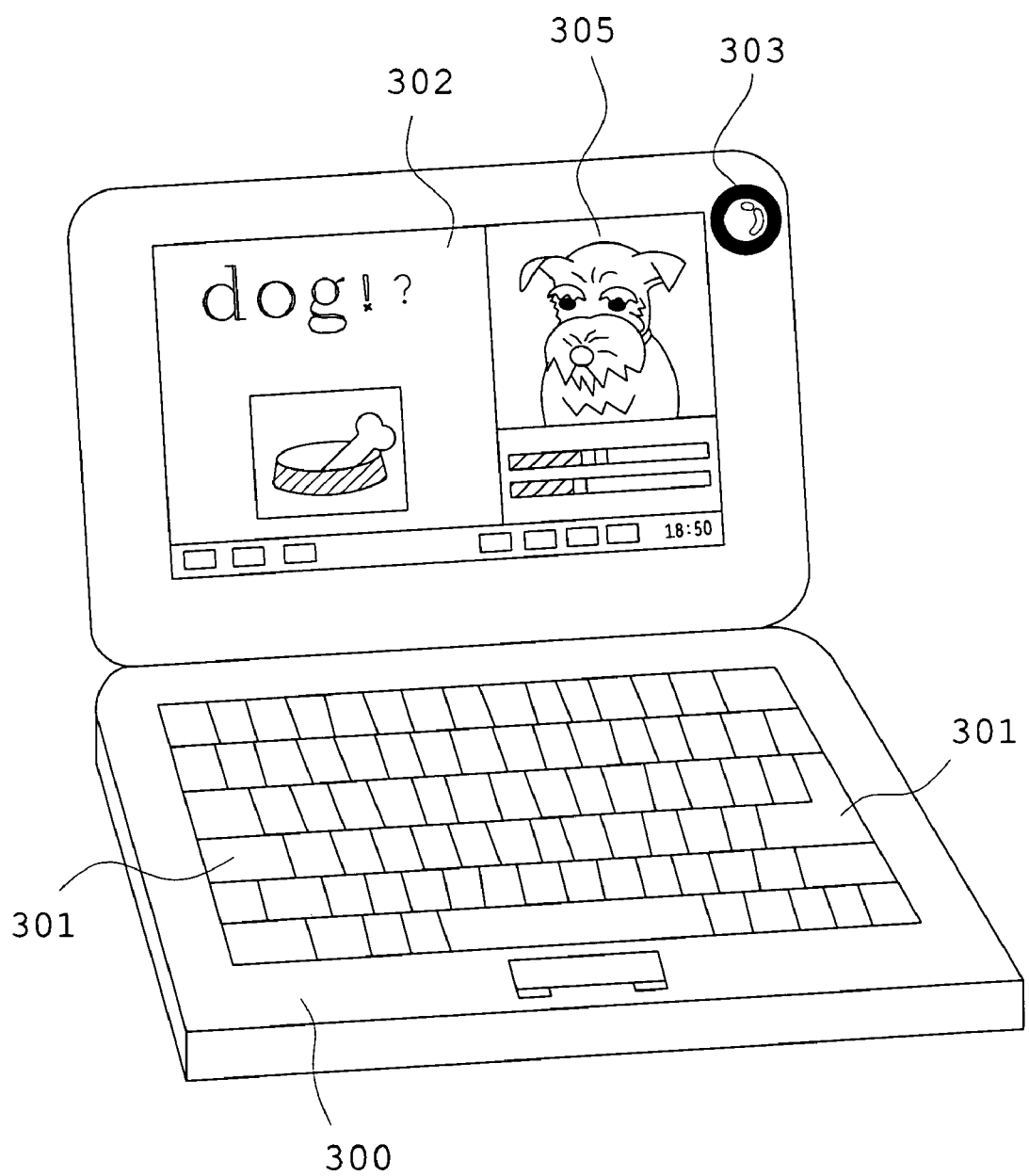
FIG. 22 is a perspective front view showing an example of a personal computer, whose cover is opened, incorporating the zoom optical system according to the present invention.
Figure 23:
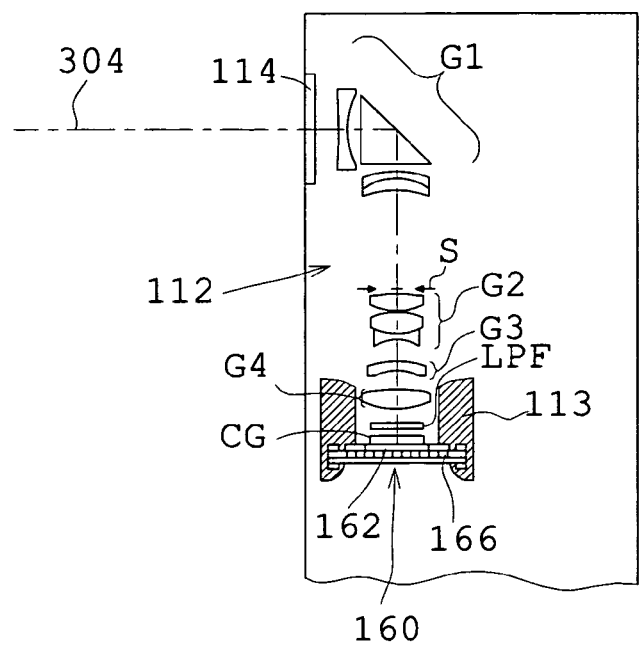
FIG. 23 is a sectional view showing a photographing optical system incorporated in the personal computer of FIG. 22.
Figure 24:
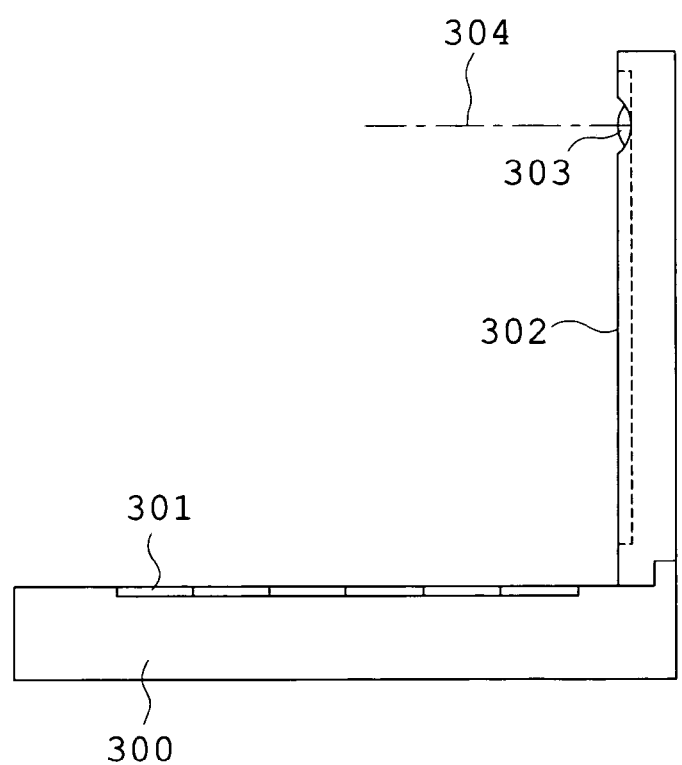
FIG. 24 is a side view showing the personal computer of FIG. 22.

Subsequently, a personal computer that is an example of an information processing apparatus incorporating the path-bending zoom optical system of the present invention as an objective optical system is illustrated in FIGS. 22-24.

A personal computer 300, as shown in FIGS. 22-24, has a keyboard 301 provided for the purpose that an operator inputs information from the exterior; an information processing means or a recording means, not shown; a monitor 302 displaying information for the operator; and a photographing optical system 303 for photographing the operator himself or surrounding images.

Here, the monitor 302 may be a transmission-type liquid crystal display element illuminated with backlight, not shown, from the back side; a reflection-type liquid crystal display element reflecting light from the front for display; or a CRT display. In FIG. 22, the photographing optical system 303 is housed in the monitor 302 upper-right, but it is not limited to this place and may be located at any place, such as the periphery of the monitor 302 or of the keyboard 301.

The photographing optical system 303 has an objective lens 112 including the path-bending zoom optical system, for example, of the first embodiment according to the present invention and an imaging element chip 162 receiving an image, located on a photographing optical path 304. These are housed in the personal computer 300.

Here, the cover glass CG is additionally cemented to the imaging element chip 162 and they are integrally constructed as an imaging unit 160. Since the imaging unit 160 is fitted into the rear end of a lens frame 113 of the object lens 112 and can be mounted in a single operation, the alignment of the objective lens 112 and the chip 162 and the adjustment of face-to-face spacing are not required and assembly is simplified. At the top (not shown) of the lens frame 113, a cover glass 114 for protecting the objective lens 112 is placed. Also, the driving mechanism of the zoom optical system in the lens frame 113 is omitted from the figure.

An object image received by the imaging element chip 162 is input into the processing means of the personal computer 300 through a terminal 166 and is displayed as an electronic image on the monitor 302. In FIG. 22, an image 305 photographed by the operator is shown as an example. It is also possible to display the image 305 on the personal computer of a communication mate lying at a remote place through the processing means and the internet or the telephone.

FIGS. 25A-25C show a telephone that is an example of the information processing apparatus housing the path-bending zoom optical system of the present invention as the photographing optical system, notably a mobile phone that is handy to carry.

A mobile phone 400, as shown in FIGS. 25A-25C, includes a microphone section 401 inputting an operator's voice as information; a speaker section 402 outputting the voice of a communication mate; input dials 403 that an operator inputs information; a monitor 404 displaying information, such as the photographed image of the operator himself or of the communication mate and telephone numbers; a photographing optical system 405; an antenna 406 transmitting and receiving communication waves; and a processing means (not shown) processing image information, communication information, and input signals. Here, the monitor 404 is a liquid crystal display element. Also, in the figures, the positions of individual components are not limited to those shown. The photographing optical system 405 has the objective lens 112 including the path-bending zoom optical system, for example, of the first embodiment according to the present invention and the imaging element chip 162 receiving an object image, located on a photographing optical path 407. These are housed in the mobile phone 400.

Here, the cover glass CG is additionally cemented to the imaging element chip 162 and they are integrally constructed as the imaging unit 160. Since the imaging unit 160 is fitted into the rear end of the lens frame 113 of the objective lens 112 and can be mounted in a single operation, the alignment of the objective lens 112 and the chip 162 and the adjustment of face-to-face spacing are not required and assembly is simplified. At the top (not shown) of the lens frame 113, the cover glass 114 for protecting the objective lens 112 is placed. Also, the driving mechanism of the zoom optical system in the lens frame 113 is omitted from the FIG.

An object image received by the imaging element chip 162 is input into the processing means, not shown, through the terminal 166 and is displayed as an electronic image on either the monitor 404 or the monitor of the communication mate, or both. Also, the processing means includes a signal processing function that when the image is transmitted to the communication mate, the information of the object image received by the chip 162 is converted into a transmittable signal.

According to the present invention, it is possible to provide the electronic imaging apparatus in which a high variable magnification ratio is ensured, but the thickness in a depth direction can be further reduced and compactness of the entire camera can be further improved.

What is claimed is:

1. An electronic imaging apparatus comprising:

a zoom optical system including, in order from an object side, a first lens unit with negative power and a second lens unit with positive power, in which lens components having refracting power in the first lens unit are only a single biconcave negative lens element located at a most object-side position and a positive lens component located at a most image-side position;

an electronic image sensor placed on an image side of the zoom optical system; and an image processing section electrically processing image data obtained by the electronic image sensor to change a shape thereof, the zoom lens system satisfying the following condition in focusing of a nearly infinite object point:

$$0.85 < |y_{07}/(f_w \cdot \tan \omega_{07w})| < 0.97$$

$$0.75 < |y_{10}/(f_w \cdot \tan \omega_{10w})| < 0.93$$

where $f_w$ is a focal length of an entire zoom optical system at a wide-angle position, $y_{10}$ is a distance from a center of an effective imaging surface to a point furthest from the center of the electronic image sensor, $y_{07}$ is an image height expressed by $0.7y_{10}$, $\omega_{07w}$ is an angle made by a direction of an object point corresponding to an image point, connecting the center of the effective imaging surface of the electronic image sensor at the wide-angle position and the position of the image height $y_{07}$, with the optical axis, and a lens component is such that only a most object-side surface and a most image-side surface thereof come in contact with air and there is no air spacing between both surfaces, taking a single lens element or a cemented lens component as one unit.

2. An electronic imaging apparatus according to claim 1, wherein the zoom optical system satisfies the following condition in focusing of a nearly infinite object point:

$$0.03 < |y_{07}/(f_w \cdot \tan \omega_{07w}) - y_{10}/(f_w \cdot \tan \omega_{10w})| < 0.15.$$

3. An electronic imaging apparatus according to claim 1, wherein the zoom optical system satisfies the following condition in focusing of a nearly infinite object point:

$$0.33 < (R_1+R_2)/(R_1-R_2) < 0.93$$

where $R_1$ is a radius of curvature of an object-side surface of the single negative lens element in the first lens unit and $R_2$ is a radius of curvature of an image-side surface of the single negative lens element in the first lens unit.

4. An electronic imaging apparatus according to claim 1, wherein the zoom optical system satisfies the following condition in focusing of a nearly infinite object point:

$$n_{d4} > 1.70$$

where $n_{d4}$ is a refractive index relating to the d line of the single negative lens element in the first lens unit.

5. An electronic imaging apparatus according to claim 1, satisfying the following condition:

$$-3.1 < f_1/f_w < -1.5$$

where f1 is a focal length of the first lens unit.

6. An electronic imaging apparatus according to claim 1, satisfying the following condition:

$$-0.85 < (R_3-R_4)/(R_3+R_4) < -0.008$$

where $R_3$ is a radius of curvature of a most object-side surface of the positive lens component in the first lens unit and $R_4$ is a radius of curvature of a most image-side surface of the positive lens component in the first lens unit.

7. An electronic imaging apparatus according to claim 1, wherein the first lens unit includes, in order from the object side, the single biconcave negative lens element, a reflecting member, and the positive lens component.

8. An electronic imaging apparatus according to claim 1, wherein the first lens unit includes, in order from the object side, the single biconcave negative lens element and the positive lens component.

9. An electronic imaging apparatus according to claim 1, wherein the positive lens component is a single positive lens element.

10. An electronic imaging apparatus according to claim 1, wherein the positive lens component is a cemented lens of a single negative lens element and a single positive lens element.

11. An electronic imaging apparatus according to claim 1, wherein a zoom unit includes the first lens unit and the second lens unit, and only the first lens unit and the second lens unit are moved to thereby change the focal length.

12. An electronic imaging apparatus according to claim 1, wherein a zoom unit includes, in order from the object side, the first lens unit, the second lens unit, and a third lens unit consisting of a single lens element, and at least the first lens unit and the second lens unit are moved to thereby change the focal length.

13. An electronic imaging apparatus according to claim 12, wherein only the first lens unit, the second lens unit, and the third lens unit are moved to thereby change the focal length.

14. An electronic imaging apparatus according to claim 1, wherein the zoom optical system includes, in order from the object side, the first lens unit with negative power, the second lens unit with positive power, and a third lens unit with negative power, and upon zooming from the wide-angle position to a telephoto position, at least the first lens unit is fixed with respect to an image plane, the second lens unit is moved toward the object side, and the third lens unit is moved along a locus that is convex toward the object side.

15. An electronic imaging apparatus according to claim 1, wherein the zoom optical system includes, in order from the object side, the first lens unit with negative power, the second lens unit with positive power, and a third lens unit with negative power, and upon zooming from the wide-angle position to a telephoto position, at least the first lens unit is fixed with respect to an image plane, the second lens unit is moved toward the image side, and the third lens unit is moved toward the object side.

16. An electronic imaging apparatus according to claim 14 or 15, wherein the zoom optical system further includes a fourth lens unit that is fixed, upon zooming, on the image side of the third lens unit.

17. An electronic imaging apparatus according to claim 1, wherein the zoom optical system includes, in order from the object side, the first lens unit with negative power and the second lens unit with positive power, and upon zooming from the wide-angle position to a telephoto position, the first lens unit is moved along a locus that is convex toward the image side and the second lens unit is moved toward the object side.

18. An electronic imaging apparatus according to claim 17, wherein the zoom optical system further includes a third lens unit consisting of a single lens on the image side of the second lens unit, and upon zooming from the wide-angle position to the telephoto position, the third lens unit is moved toward the object side.

19. An electronic imaging apparatus according to claim 18, wherein the third lens unit has positive refracting power.

20. An electronic imaging apparatus according to claim 18, wherein the third lens unit has negative refracting power.

21. An electronic imaging apparatus according to claim 14 or 15, wherein the zoom optical system includes four lens units.

22. An electronic imaging apparatus according to claim 17, wherein the zoom optical system includes two lens units.

23. An electronic imaging apparatus according to claim 18, wherein the zoom optical system includes three lens units.

24. An electronic imaging apparatus according to claim 1, wherein the zoom optical system further satisfies following conditions:

$$0.85 < |y_{07}/(f_w \cdot \tan \omega_{07w})| < 0.96$$

$$0.75 < |y_{10}/(f_w \cdot \tan \omega_{10w})| < 0.91.$$

25. An electronic imaging apparatus according to claim 2, wherein the zoom optical system further satisfies following condition:

$$0.05 < |y_{07}/(f_w \cdot \tan \omega_{07w}) - y_{10}/(f_w \cdot \tan \omega_{10w})| < 0.10.$$

26. An electronic imaging apparatus according to claim 3, wherein the zoom optical system further satisfies following condition:

$$0.5 < (R_1+R_2)/(R_1-R_2) < 0.93$$

27. An electronic imaging apparatus according to claim 3, wherein the zoom optical system further satisfies following condition:

$$0.4 < (R_1+R_2)/(R_1-R_2) < 0.88.$$

* * * * *